United States Patent
Omr et al.

(10) Patent No.: US 10,302,435 B2
(45) Date of Patent: May 28, 2019

(54) METHOD AND SYSTEM FOR ENHANCED NAVIGATION WITH MULTIPLE SENSORS ASSEMBLIES

(71) Applicant: InvenSense, Inc., San Jose, CA (US)

(72) Inventors: Medhat Omr, Calgary (CA); Jacques Georgy, Calgary (CA); Aboelmagd Noureldin, Calgary (CA)

(73) Assignee: InvenSense, Inc., San Jose, CA (US)

( * ) Notice: Subject to any disclaimer, the term of this patent is extended or adjusted under 35 U.S.C. 154(b) by 22 days.

(21) Appl. No.: 14/917,922

(22) PCT Filed: Sep. 17, 2014

(86) PCT No.: PCT/CA2014/000698
§ 371 (c)(1),
(2) Date: Mar. 9, 2016

(87) PCT Pub. No.: WO2015/039216
PCT Pub. Date: Mar. 26, 2015

(65) Prior Publication Data
US 2016/0216119 A1    Jul. 28, 2016

Related U.S. Application Data

(60) Provisional application No. 61/878,952, filed on Sep. 17, 2013.

(51) Int. Cl.
*G01C 21/16* (2006.01)
*G01C 21/20* (2006.01)

(52) U.S. Cl.
CPC ........... *G01C 21/20* (2013.01); *G01C 21/165* (2013.01)

(58) Field of Classification Search
CPC .............................. G01C 21/20; G01C 21/165
See application file for complete search history.

(56) References Cited

U.S. PATENT DOCUMENTS 5,245,909 A * 9/1993 Corrigan .................. F41G 1/54
                                                                    89/41.19
6,789,014 B1    9/2004 Rekow et al.
(Continued)

FOREIGN PATENT DOCUMENTS

| EP | 2023083 A2 | 2/2009 | |
| GB | 2497153 A | 6/2013 | |
| WO | WO 2013089783 A1 * | 6/2013 | ........... G01C 21/165 |

OTHER PUBLICATIONS

Supplementary Europearn Search Report—EP 14845682—EPO—dated Apr. 26, 2017.

*Primary Examiner* — Aaron L Troost
(74) *Attorney, Agent, or Firm* — Bay Area Technology Law Group PC

(57) ABSTRACT

The present disclosure relates to a method and system for providing and enhanced navigation solution of a device within a platform (such as for example person, vehicle, or vessel of any type), wherein the device is within the platform and may be strapped or non-strapped to the platform, wherein in case of non-strapped the mobility of the device may be constrained or unconstrained within the platform, wherein the enhancement of the navigation solution is through multiple sensor assemblies, wherein the multiple sensors assemblies are not necessarily all on the device, and wherein the multiple sensors assemblies are within the platform. This method works for a navigation solution utilizing measurements from sensors (such as for example, accelerometers, gyroscopes, magnetometers etc.) whether in the presence or in the absence of absolute navigational information (such as, for example, GNSS or WiFi positioning).

30 Claims, 44 Drawing Sheets

(56) References Cited

U.S. PATENT DOCUMENTS

| | | | | |
|---|---|---|---|---|
| 8,457,891 B1* | 6/2013 | Vallot | ................... | G05D 1/101 |
| | | | | 701/501 |
| 2008/0114544 A1* | 5/2008 | Liu | ................... | G01C 21/165 |
| | | | | 701/480 |
| 2009/0254279 A1* | 10/2009 | Han | ................... | G01C 21/16 |
| | | | | 701/501 |
| 2011/0125404 A1* | 5/2011 | Czompo | ............. | G01C 21/165 |
| | | | | 701/472 |
| 2012/0296603 A1* | 11/2012 | Kulik | ................... | G01C 22/006 |
| | | | | 702/160 |
| 2013/0332064 A1* | 12/2013 | Funk | ................... | G01C 21/206 |
| | | | | 701/409 |
| 2014/0149145 A1* | 5/2014 | Peng | ................... | G06F 3/0346 |
| | | | | 705/4 |
| 2014/0278206 A1* | 9/2014 | Girod | ................... | G01C 15/00 |
| | | | | 702/141 |
| 2014/0379207 A1* | 12/2014 | Katsman | ............. | G01C 21/165 |
| | | | | 701/33.2 |

* cited by examiner

METHOD AND SYSTEM FOR ENHANCED NAVIGATION WITH MULTIPLE SENSORS ASSEMBLIES

TECHNICAL FIELD

The present disclosure relates to a method and system for providing an enhanced navigation solution of a device within a platform (such as for example person, vehicle, or vessel of any type), wherein the device is within the platform and may be strapped or non-strapped to the platform, where in case of the device being non-strapped, the mobility of the device may be constrained or unconstrained within the platform, the enhancement of the navigation solution being achieved through multiple sensor assemblies, wherein the multiple sensors assemblies are not necessarily all on the device, and wherein the multiple sensors assemblies are within the platform.

BACKGROUND

Inertial navigation of a platform is based upon the integration of specific forces and angular rates measured by inertial sensors (e.g. accelerometer, gyroscopes) by a device containing the sensors. In general, the device is positioned within the platform and commonly strapped to the platform, and measurements from the device may be used to determine the position, velocity and attitude of the device and/or the platform.

The platform may be a motion-capable platform that may be temporarily stationary (e.g. a person, a vehicle or a vessel of any type. The vessel may be land-based, marine or airborne.

Alignment of the inertial sensors within the platform (and with the platform's forward, transversal and vertical axis) is critical for inertial navigation. If the inertial sensors, such as accelerometers and gyroscopes are not exactly aligned with the platform, the positions and attitude calculated using the readings of the inertial sensors will not be representative of the platform. Fixing the inertial sensors within the platform is thus a requirement for navigation systems that provide high accuracy navigation solutions.

For strapped systems, one known means for ensuring optimal navigation solutions is to utilize careful manual mounting of the inertial sensors within the platform. However, portable navigation devices (or navigation-capable devices) are able to move whether constrained or unconstrained within the platform (such as for example a person or vehicle), so careful mounting is not an option.

For navigation, mobile/smart phones are becoming very popular as they come equipped with Assisted Global Positioning System (AGPS) chipsets (in addition to significantly improving the startup performance by utilizing network connection) also further use high sensitivity capabilities to provide absolute positions of the platform (e.g. user) even in some environments that cannot guarantee clear line of sight to satellite signals. Deep indoor or challenging outdoor navigation or localization incorporates cell tower ID or, if possible, cell towers trilateration for a position fix where AGPS solution is unavailable. Despite these two positioning methods that already come in many mobile devices, accurate indoor localization still presents a challenge and fails to satisfy the accuracy demands of today's location based services (LBS). Additionally, these methods may only provide the absolute heading of the platform without any information on the device's heading.

Many mobile devices, such as mobile phones, are equipped with Micro Electro Mechanical System (MEMS) sensors that are used predominantly for screen control and entertainment applications. These sensors have not been broadly used to date for navigation purposes due to very high noise, large random drift rates, and frequently changing orientations with respect to the carrying platform or person.

Magnetometers are also found within many mobile devices. In some cases, it has been shown that a navigation solution using accelerometers and magnetometers may be possible if the user is careful enough to keep the device in a specific orientation with respect to their body, such as when held carefully in front of the user after calibrating the magnetometer.

As such, there is a need for a navigation solution capable of accurately utilizing measurements from a device within a platform to determine the navigation state of the device/platform without any constraints on the platform (i.e. in indoor or outdoor environments) or the mobility of the device. The estimation of the position and attitude of the platform has to be independent of the usage of the device (e.g. the way the user is holding or moving the device during navigation).

In the case of portable devices, the device may be tilted to any orientation; it is required that the device provide seamless navigation even in such scenarios.

In addition to the above mentioned application of portable devices, such as for example smart phones and tablets, (that may involve a full navigation solution including position, velocity and attitude, or position and attitude), there are other applications (that may involve estimating a full navigation solution, or an attitude only solution or an attitude and velocity solution) where the method to mitigate the aforementioned problems is needed for enhancing the user experience and usability, and may be applicable in a number of scenarios such as, for example:

Video gaming equipment;
Augmented reality equipment;
Wearable computing devices (such as for example smart wrist watches, and smart glasses); or
APPlication acCESSORIES or Appcessories (such as for example digital wrist watches, electronic glasses, and electronic belt clips).

The main challenge is that the low-cost MEMS sensors in current wearable computing devices, appcessories, or even portable devices are considered insufficient for reliable navigation purposes due to very high noise, large random drift rates, and especially for such mobile devices that can freely change orientation with respect to the platform or person. Some prior solutions to overcome the sensors errors is better error modeling, however this is harder for portable navigation which also still have the hard problem of varying orientation with respect to the platform or person.

Thus methods of further enhancing the performance of navigation solutions (that may involve estimating position, velocity and attitude, or any subset or combination thereof) of portable devices, wearable devices, and/or appcessories among others are needed.

SUMMARY

The present disclosure relates to a method and system for providing an enhanced navigation solution of a device within a platform (such as for example person, vehicle, or vessel of any type), wherein the device may be strapped or non-strapped to the platform, wherein in case where the device is non-strapped the mobility of the device may be constrained or unconstrained within the platform, wherein the enhancement of the navigation solution is through multiple sensor assemblies, wherein the multiple sensors assemblies may or may not be all positioned on the device, but wherein the multiple sensors assemblies are within the platform. The present method and system aims to provide a navigation solution utilizing measurements (readings) from sensors (such as for example, accelerometers, gyroscopes, magnetometers etc.) whether in the presence or in the absence of absolute navigational information (such as, for example, GNSS or WiFi positioning).

In some embodiments, the present navigation solution can be enhanced through bounding or constraining the navigation solution on at least one device (containing at least one sensor assembly) within the platform for which the navigation solution is to be enhanced, wherein the bounding or constraining is by the navigation solutions of the other sensor assemblies within the platform. In some embodiments, the bounding or constraining may be any one or any combination of the following: (i) a two dimensional position bounding, (ii) a three dimensional position bounding, (iii) a height bounding, (iv) a two dimensional velocity bounding, (v) a three dimensional velocity bounding, (vi) a vertical velocity bounding, (vii) a heading angle bounding, (viii) a pitch angle bounding, or (ix) a roll angle bounding. In some embodiments, the bounding may be a statistical bounding. In some embodiments, the bounding is through providing measurement updates to the state estimation technique used in the navigation solution.

In some embodiments, the present navigation solution can be enhanced through calculating or estimating the misalignment between the at least one device containing at least one sensor assembly and the platform, wherein at least one other sensor assembly within the platform is used for this calculation or estimation. In some of these embodiments, the calculated or estimated misalignment may be used to enhance the navigation solution of the device for which the misalignment was calculated or estimated. In some these embodiments, the calculated or estimated misalignment may be combined, averaged, smoothed, filtered with the misalignment of the same device calculated by any other method or means.

In some embodiments, wherein the navigation solution includes a mode of motion or conveyance detection technique, the present navigation solution can be enhanced through aiding the mode of motion or conveyance detection on at least one device (containing at least one sensor assembly) within the platform for which the navigation solution is to be enhanced, wherein the aiding is either by the sensor readings of or by the mode of motion or conveyance detection of the other sensor assemblies within the platform.

In some embodiments, the present navigation solution can be enhanced through integrity or consistency assessment of the navigation solution on at least one device (containing at least one sensor assembly) within the platform for which the navigation solution is to be enhanced, wherein the integrity or consistency assessment is by utilization of the other sensor assemblies within the platform or their navigation solutions. In some embodiments, the integrity or consistency assessment may be utilized to whether include or exclude the navigation solutions of some sensor assemblies from any type of the aforementioned aiding or enhancement to the navigation solutions of other sensor assemblies.

Any one or any combination of the above mentioned embodiments can be used.

Broadly stated, in some embodiments, a method and system for providing an enhanced navigation solution of at least one device within a platform, the device being strapped or non-strapped to the platform, and where non-strapped, the mobility of the device being constrained or unconstrained within the platform, the method comprising the use of at least two sensor assemblies within the platform, wherein at least one of the assemblies within the platform is on at least one device within the platform.

DESCRIPTION OF EMBODIMENTS

Figure 1:
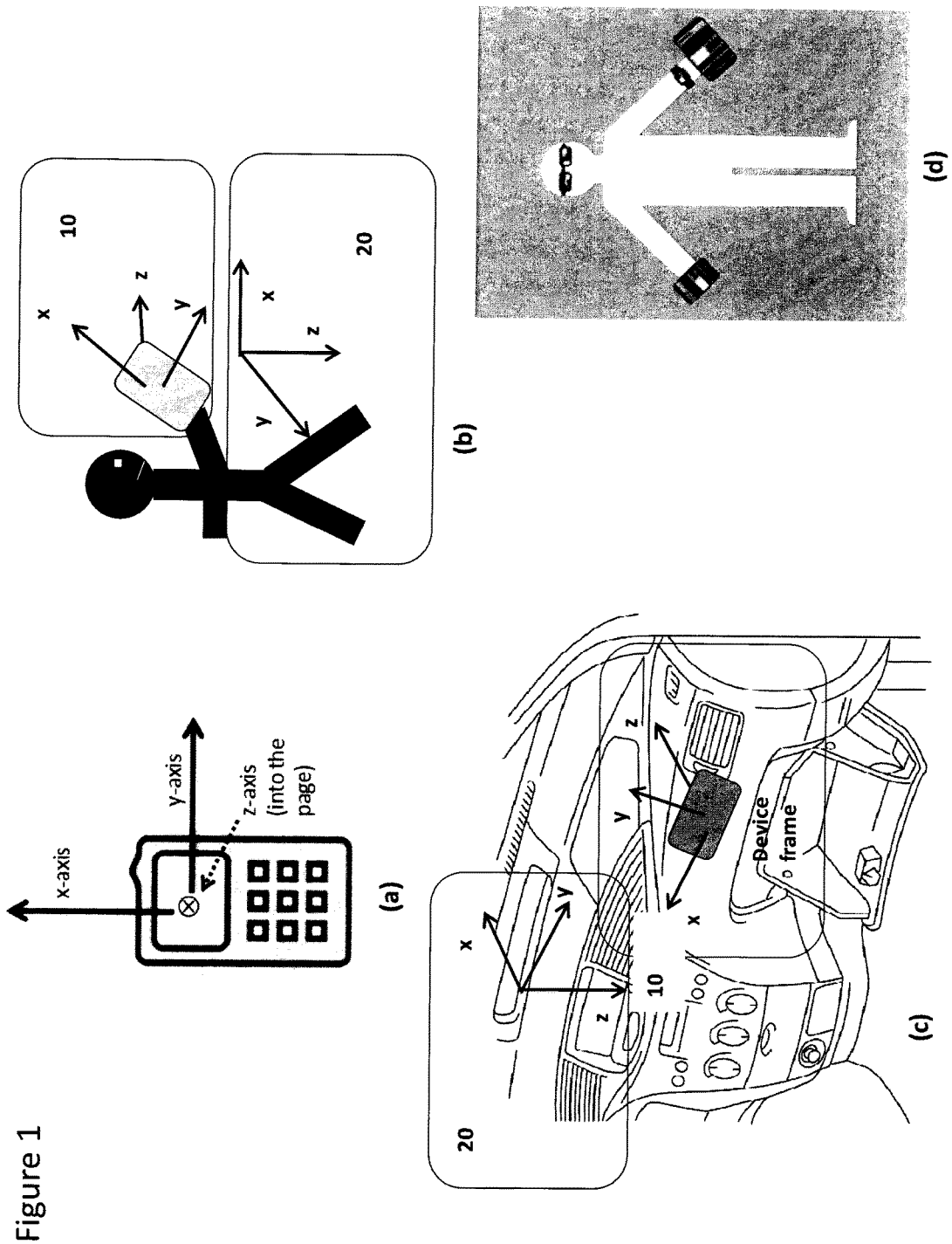
FIG. 1 shows the sensitive axes of the device (a), a depiction of one embodiment of the at least one device within the platform, where the platform is a person (b) or a vehicle (c), a depiction of one embodiment with multiple devices within a platform where the platform is a person (d)

The present disclosure relates to a method and system for providing an enhanced navigation solution of a device and a platform (such as for example person, vehicle, or vessel of any type), wherein the device may be strapped or non-strapped to the platform, wherein in case of non-strapped the mobility of the device may be constrained or unconstrained within the platform, wherein the enhancement of the navigation solution occurs through multiple sensor assemblies, wherein the multiple sensors assemblies are not necessarily all on the device, and wherein the multiple sensors assemblies are within the platform. This method works for a navigation solution utilizing measurements (readings) from sensors (such as for example, accelerometers, gyroscopes, magnetometers etc.) whether in the presence or in the absence of absolute navigational information (such as, for example, GNSS or WiFi positioning).

The platform can be a motion-capable platform that may be temporarily stationary. Some of the examples of platforms may be a person, a vehicle or a vessel of any type. The vessel may be land-based, marine or airborne.

It is understood that the device is considered to be "strapped", strapped down, or tethered to the platform when it is physically connected to the platform in a fixed manner that does not change with time during navigation. In the case of strapped devices, the relative position and orientation between the device and platform does not change with time during navigation. The device is "non-strapped" or non-tethered when the device has some mobility relative to the platform (or within the platform), meaning that the relative position or relative orientation between the device and platform may change with time during navigation. The device may be "non-strapped" in two scenarios: where the mobility of the device within the platform is "unconstrained", or where the mobility of the device within the platform is "constrained". One example of "unconstrained" mobility may be a person moving on foot and having a portable device such as a smartphone in the their hand for texting or viewing purposes (hand may also move), at their ear, in hand and dangling/swinging, in a belt clip, in a pocket, among others, where such use cases can change with time and even each use case can have a changing orientation with respect to the user. Another example where the mobility of the device within the platform is "unconstrained" is a person in a vessel or vehicle, where the person have a portable device such as a smartphone in the their hand for texting or viewing purposes (hand may also move), at their ear, in a belt clip, in a pocket, among others, where such use cases can change with time and even each use case can have a changing orientation with respect to the user. An example of "constrained" mobility may be when the user enters a vehicle and puts the portable device (such as smartphone) in a rotation-capable holder or cradle. In this example, the user may rotate the holder or cradle at any time during navigation and thus may change the orientation of the device with respect to the platform or vehicle. Another example where the mobility of the device within the platform is "constrained" is a person moving on foot and having a portable device such as a smartphone in a belt clip, or personnel (such as police, firefighters, or military) having the device in a chest mount or harness. Such constrained cases in a non-strapped device can be called "semi-strapped", "pseudo-strapped", "semi-tethered", "pseudo-tethered". It is understood that a device may have constrained mobility (pseudo-tethered) for some duration of time then become unconstrained for some other duration of time, and so on.

Absolute navigational information is information related to navigation and/or positioning and are provided by "reference-based" systems that depend upon external sources of information, such as for example Global Navigation Satellite Systems (GNSS). On the other hand, self-contained navigational information is information related to navigation and/or positioning and is provided by self-contained and/or "non-reference based" systems within a device/platform, and thus need not depend upon external sources of information that can become interrupted or blocked. Examples of self-contained information are readings from motion sensors such as accelerometers and gyroscopes.

It should be noted that the present method can be used in a variety of applications including those that involve navigation solution including:
  position, velocity and attitude or
  only position and attitude,
or partial navigation solution including:
  only attitude and velocity or
  only attitude.

In the case of non-strapped device, during normal use, the attitude of a device (e.g. portable phone) changes freely. Indeed, such devices often undergo rotational movements along any of their major axes (e.g. the x-axis, y-axis and z-axis) when positioned, for example, for texting in either landscape or portrait view, when positioned on a belt, in pocket, or near a user's ear during phone use (these are examples when the device is a phone).

Such axes and their frame 10 are defined in FIGS. 1(a), (b) and (c). Having regard for FIG. 1(a) the forward axis of the device is defined as x-axis, the vertical or z-axis is pointing downward and the transversal axis or y-axis is defined in a way to complete the right handed coordinate system. FIG. 1 (d) shows different portable and wearable devices that may contain sensor assemblies.

In the case of non-strapped device, the orientation of a device within a platform is not representative of the orientation of the platform. The device 10 may undergo any number of rotational movements along any of its major axes, with respect to the platform 20. These rotational movements of the device do not indicate that the platform is going through the same changes in orientation. For example, the user or platform may be moving on a leveled 2D plane while the device may be undergoing any number of possible roll and pitch angles. FIG. 1 shows several possible relationships between a device 10 and different platforms 20.

Typical portable devices include accelerometers for measuring accelerations or specific forces, along each of the sensitive axis, i.e., the x-axis, y-axis and the z-axis. It is known that "roll" is defined as the rotation of the device along the forward x-axis, while "pitch" is the rotation along the lateral y-axis. In the case of non-strapped device, because the device user is free to rotate the device as desired, the device can have several changes in roll, pitch and heading with respect to the platform.

In some embodiments, the present navigation solution can be enhanced through bounding or constraining the navigation solution of at least one device (containing at least one sensor assembly) within the platform for which the navigation solution is to be enhanced, wherein the bounding or constraining is by the navigation solutions of the other sensor assemblies within the platform. In some embodiments, the bounding or constraining may be any one or any combination of the following: (i) a two dimensional position bounding, (ii) a three dimensional position bounding, (iii) a height bounding, (iv) a two dimensional velocity bounding, (v) a three dimensional velocity bounding, (vi) a vertical velocity bounding, (vii) a heading angle bounding, (viii) a pitch angle bounding, or (ix) a roll angle bounding. In some of these embodiments the bounding or constraining is achieved through statistical bounding of the solutions from different sensor assemblies and using this to constrain one or more of these solutions. In some embodiments, this bounding or constraining may be through providing updates to the filtering or state estimation technique in the one or more solutions to be enhanced.

In some embodiments, the present navigation solution can be enhanced through calculating or estimating the misalignment between the at least one device containing at least one sensor assembly and the platform, wherein at least one other sensor assembly within the platform is used for this calculation or estimation. In some embodiments, the calculated or estimated misalignment may be used to enhance the navigation solution of the device for which the misalignment was calculated or estimated. In other embodiments, the calculated or estimated misalignment may be combined, averaged, smoothed, filtered with the misalignment of the same device calculated by any other method or means.

In some embodiments, the present navigation solution can be enhanced through both: (i) bounding or constraining the navigation solution of at least one device (containing at least one sensor assembly) within the platform for which the navigation solution is to be enhanced, wherein the bounding or constraining is by the navigation solutions of the other sensor assemblies within the platform; (ii) calculating or estimating the misalignment between the at least one device containing at least one sensor assembly and the platform, wherein at least one other sensor assembly within the platform is used for this calculation or estimation. In some of this group of embodiments, the calculated or estimated misalignment may be used to enhance the navigation solution of the device for which the misalignment was calculated or estimated. In some of this group of embodiments, the calculated or estimated misalignment may be combined, averaged, smoothed, filtered with the misalignment of the same device calculated by any other method or means.

In some embodiments, wherein the navigation solution includes a mode of motion or conveyance detection technique, the present navigation solution can be enhanced through aiding the mode of motion or conveyance detection on at least one device (containing at least one sensor assembly) within the platform for which the navigation solution is to be enhanced, wherein the aiding is either by the sensor readings of or by the mode of motion or conveyance detection of the other sensor assemblies within the platform.

In some embodiments, the present navigation solution can be enhanced through integrity or consistency assessment of the navigation solution of at least one device (containing at least one sensor assembly) within the platform for which the navigation solution is to be enhanced, wherein the integrity or consistency assessment is by utilization of the other sensor assemblies within the platform or their navigation solutions. In some embodiments, the integrity or consistency assessment may be utilized to include or exclude the navigation solutions of some sensor assemblies from any type of the aforementioned aiding or enhancement to the navigation solutions of other sensor assemblies.

Figure 2:
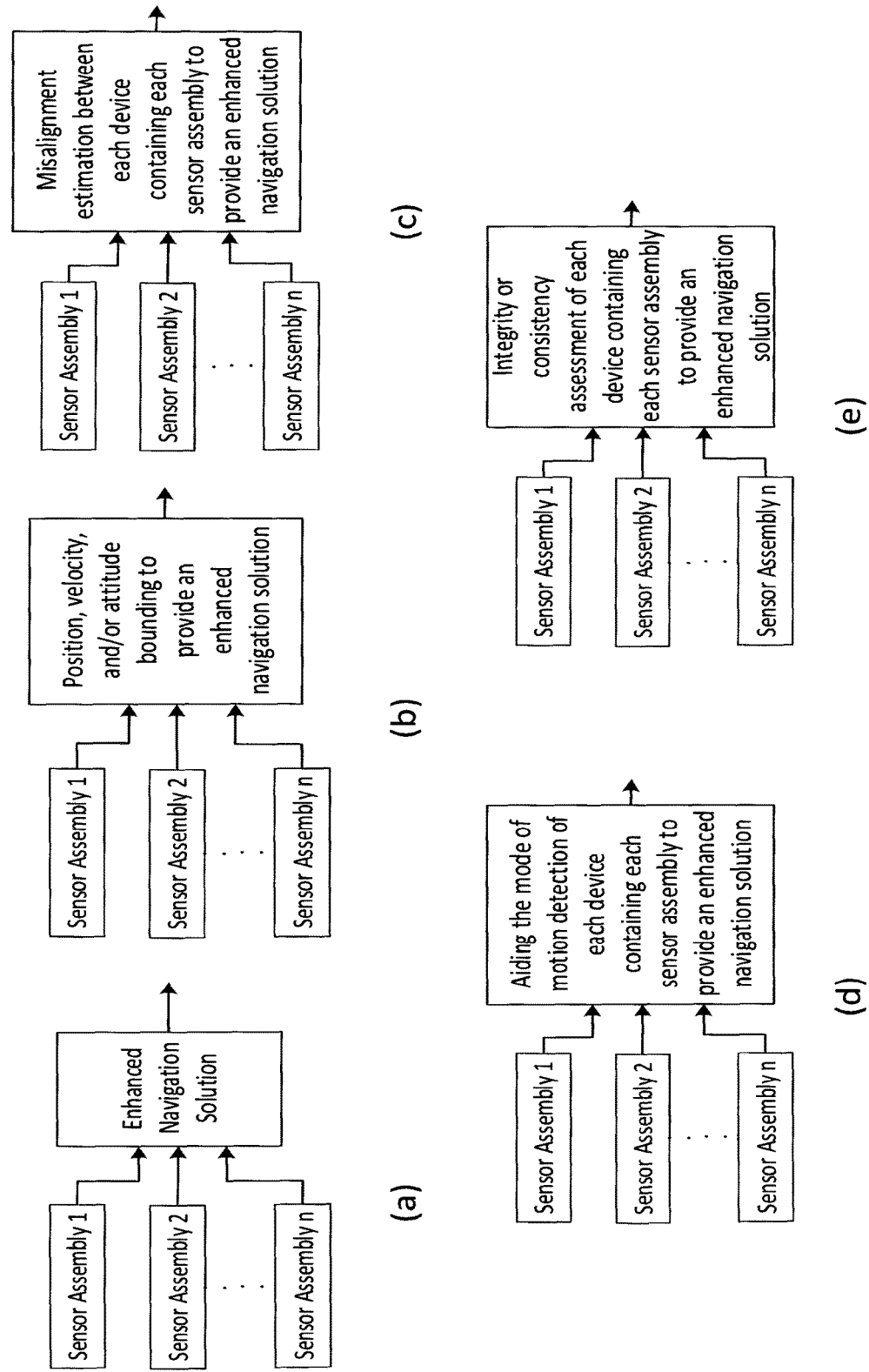
FIG. 2 some exemplary block diagrams of some embodiments of the present method.

FIG. 2 shows block diagrams for some embodiments of the present method.

Any one or any combination of the above mentioned embodiments can be used.

In some embodiments of the present method and system, the application is related to wearable computing devices, portable devices such as smartphones/tablets, and/or appcessories among others. Given the fact that it is likely that a user will have multiple devices among the abovementioned groups, the use of the sensors assemblies on the different available devices can be exploited to enhance the navigation solution through the use of multi-sensor assemblies. At least one device whether a wearable computing device such as smart glasses/smart watch or portable device such as smartphone/tablet and which possesses enough computing power to run the proposed technique may be present. The sensors in this device can be integrated with the sensors in one or more other devices whether wearable computing devices like a smart watch, portable devices such as for example a tablet, or appcessories like a belt clip or keychain to produce a higher accuracy navigation solution. The present method and system benefit from this redundancy of sensors to get better navigation results. The present method and system can benefit from any multiple of the abovementioned devices carried by the same user and wirelessly connected together. Benefiting from the multiple triads and integrating them noticeably enhances the final results.

The method and system presented herein may be combined with any navigation solution independent of the type of the state estimation or filtering technique used in this navigation solution. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or non-linear, short memory length or long memory length) and/or automatic calibration for the errors of inertial sensors and/or the other sensors used.

The present method and system can be combined with a mode of motion or conveyance detection technique to establish the mode of motion or conveyance. This enables different scenarios such as for example walking and in-vehicle among other possible modes.

CONTEMPLATED EMBODIMENTS

The present disclosure describes the body frame to be x forward, y positive towards right side of the body and z axis positive downwards. It is contemplated that any body-frame definition can be used for the application of the method described herein.

It is contemplated that the method and system presented above can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that the method and system presented above can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the method and system presented above can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the method and system presented above can also be used with a navigation solution that, when working either in a tightly coupled scheme or a hybrid loosely/tightly coupled option, need not be bound to utilize pseudorange measurements (which are calculated from the code not the carrier phase, thus they are called code-based peudoranges) and the Doppler measurements (used to get the pseudorange rates). The carrier phase measurement of the GNSS receiver can be used as well, for example: (i) as an alternate way to calculate ranges instead of the code-based peudoranges, or (ii) to enhance the range calculation by incorporating information from both code-based pseudorange and carrier-phase measurements, such enhancement is the carrier-smoothed pseudorange.

It is further contemplated that the method and system presented above can also be used with a navigation solution that relies on an ultra-tight integration scheme between GNSS receiver and the other sensors' readings.

It is further contemplated that the method and system presented above can also be used with a navigation solution that uses various wireless communication systems that can also be used for positioning and navigation either as an additional aid (will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the method and system presented above can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the method and system presented above can also be used with various types of inertial sensors, other than MEMS based sensors described herein by way of example.

Without any limitation to the foregoing, the embodiments presented above are further demonstrated by way of the following examples.

EXAMPLES

Example 1—Enhancing the Navigation Solution of at Least One of the Devices by Statistical Combination of the Navigation Solutions from the Available Multiple Sensor Assemblies In this example, the navigation solutions from the multiple sensor assemblies are used to bound or constrain each other. One possible way demonstrated in this example, is to statistically combine the solutions and use this as an update to the integration filter or state estimation technique of the device (or all devices) which solutions are to be enhanced. In this example, for demonstration purposes, the statistical combination or the fusion problem of the multiple sensor assemblies is defined as a statistical model estimation problem, and this solution obtained for this estimation problem is used to update a recursive statistical estimators, with a decentralized filter architecture. In one embodiment the statistical combination is using a weighted average as the statistical combination. in another embodiment, the statistical combination is obtained through statistical model estimation problem that is solved using Maximum Likelihood estimator (MLE). The latter can lead to a closed form such as the former, or can be used as an online method. In one embodiment the state estimation technique is a recursive statistical estimator which is Kalman filter.

The benefit of using both statistical model estimator plus recursive statistical estimator with decentralized filter architecture is to overcome high computation power required by other types of architectures such as centralize filter architecture and at the same time not to scarify accuracy that much.

There are different statistical estimators were tested and different update schemes as well. Maximum Likelihood estimator (MLE) was one possibility and which resulted in the derivation of weighted average estimator using sensor covariance matrices for weighting as the final estimator. Flat average was another possibility due to enjoying very low computation power demand, in addition to this, being the reasonable alternative to weighted average in case of there is no available knowledge about certain sensor assembly's co-variance matrix.

As an example on different update schemes that were tested is, dividing the multiple sensor assemblies' problem into n−1 dual sensor assemblies' problems, and updating the statistical estimator n−1 times where n is the number of connected sensor assemblies at a certain instant of time, and use the n−1 solutions of these dual sensor assemblies' problems as a suggested update scheme for the final statistical estimator.

Eventually, the best found estimator and update scheme were chosen to be Maximum Likelihood estimator (MLE) to solve the statistical model estimation problem and the solution was weighted average of all the current readings of the connected sensor assemblies, weighted by the covariance matrix of each assembly. And the recursive statistical estimator is Kalman filter with decentralized architecture and updated once at a time using the weighted average result of all the sensor assemblies.

In the following section, a derivation for the statistical model estimation solution is presented using MLE. The solution is derived for two sensor assemblies only, both position and velocity equations, then extended to three sensor assemblies and multiple sensor assemblies thereafter.

1. Dual Sensor Assemblies Constraint

3D Position Equations

In this section it is desired to get the optimal 3D position of a platform given the solution (whether it is, for example among others, PDR, INS, or any integrated navigation solution) of two modules hosted by the same platform.

In the first step, letting $X_A$ be the solution (or a component of the solution) of the first sensor assembly, and $X_B$ be the solution (or a component of the solution) of the second sensor assembly, moreover, assuming $X_A$ is independent on $X_B$, and by applying Maximum Likelihood Estimator (MLE) as follow $$\max_{\hat{X}_A \hat{X}_B} f(\hat{X}_A \hat{X}_B \mid X_A X_B) \tag{1}$$

$$\max_{\hat{X}_A \hat{X}_B} f(\hat{X}_A \mid X_A) f(\hat{X}_B \mid X_B) \tag{2}$$

And assuming Gaussian PDF $$F = Qe^G \tag{3}$$

Where:

$$Q = \frac{1}{\sqrt{(2\pi)^3 \sigma_{X_A} \sigma_{X_B}}}$$

$$G = -\frac{1}{2\sigma_{\hat{X}_A}^2}(\hat{X}_A - X_A)^2 - \frac{1}{2\sigma_{\hat{X}_B}^2}(\hat{X}_B - X_B)^2$$

Also taking into consideration the following constraint $$\hat{X}_A = \hat{X}_B \tag{4}$$

One can define this constrained problem as follow and use Lagrange Multiplier for solving it, $$L(X, \lambda) = f(X_A, X_B) + \sum_{j=1}^{m} \lambda_j h_j(\hat{X}_A, \hat{X}_B) \tag{5}$$

$$= Qe^G + \lambda(\hat{X}_A - \hat{X}_B)$$

$$\frac{\partial L}{\partial \hat{X}_A} = Qe^G \cdot \frac{\partial G}{\partial \hat{X}_A} + \lambda \tag{6}$$

$$= Qe^G \cdot \left(\frac{-1}{\sigma_{\hat{X}_A}^2}(\hat{X}_A - X_A)\right) + \lambda$$

$$= 0$$

Similarly, $$\frac{\partial L}{\partial \hat{X}_B} = Qe^G \cdot \frac{\partial G}{\partial \hat{X}_B} + \lambda \tag{7}$$

$$= Qe^G \cdot \left(\frac{-1}{\sigma_{\hat{X}_B}^2}(\hat{X}_B - X_B)\right) - \lambda$$

$$= 0$$

$$\frac{\partial L}{\partial \lambda} = \hat{X}_A - \hat{X}_B \tag{8}$$

$$= 0$$

Or $$\hat{X}_A = \hat{X}_B \tag{9}$$

By adding (5)+(6)

$$Qe^G \cdot \left(\left(\frac{-1}{\sigma_{\hat{X}_A}^2}(\hat{X}_A - X_A)\right) + \left(\frac{-1}{\sigma_{\hat{X}_B}^2}(\hat{X}_B - X_B)\right)\right) = 0 \tag{10}$$

But $Q\,e^G \neq 0$, therefore $$\frac{1}{\sigma_{\hat{X}_A}^2}\hat{X}_A + \frac{1}{\sigma_{\hat{X}_B}^2}\hat{X}_B = \frac{1}{\sigma_{\hat{X}_A}^2}X_A + \frac{1}{\sigma_{\hat{X}_B}^2}X_B \tag{11}$$

Also $\hat{X}_A = \hat{X}_B$, therefore $$\hat{X}_A = \frac{\frac{1}{\sigma_{\hat{X}_A}^2}}{\frac{1}{\sigma_{\hat{X}_A}^2} + \frac{1}{\sigma_{\hat{X}_B}^2}} X_A + \frac{\frac{1}{\sigma_{\hat{X}_B}^2}}{\frac{1}{\sigma_{\hat{X}_A}^2} + \frac{1}{\sigma_{\hat{X}_B}^2}} X_B \tag{12}$$

3D Velocity

Following the same steps stated in the previous section. Equation (11) becomes $$\frac{1}{\sigma_{\hat{X}_A}^2}\hat{V}_A + \frac{1}{\sigma_{\hat{X}_B}^2}\hat{V}_B = \frac{1}{\sigma_{\hat{X}_A}^2}V_A + \frac{1}{\sigma_{\hat{X}_B}^2}V_B \tag{13}$$

but $\hat{V}_A = \hat{V}_B$, therefore $$\hat{V}_A = \frac{\frac{1}{\sigma_{\hat{V}_A}^2}}{\frac{1}{\sigma_{\hat{V}_A}^2} + \frac{1}{\sigma_{\hat{V}_B}^2}} V_A + \frac{\frac{1}{\sigma_{\hat{V}_B}^2}}{\frac{1}{\sigma_{\hat{V}_A}^2} + \frac{1}{\sigma_{\hat{V}_B}^2}} V_B \tag{14}$$

2. Multiple Sensor Assemblies Constraint

In this section it is desired to get the optimal 3D position of a platform given the solution (whether it is, for example among others, PDR, INS, or any integrated navigation solution) of three modules hosted by the same platform, Applying Maximum Likelihood Estimator (MLE)

$$\max_{\hat{X}_A \hat{X}_B \hat{X}_C} f(\hat{X}_A \hat{X}_B \hat{X}_C \mid X_A X_B X_C) \tag{15}$$

But by assuming that $X_A$ completely independent on $X_B$ and $X_C$ $$\max_{\hat{X}_A \hat{X}_B \hat{X}_C} f(\hat{X}_A \mid X_A) f(\hat{X}_B \mid X_B) f(\hat{X}_C \mid X_C) \tag{16}$$

And assuming Gaussian PDF $$F = Qe^G \tag{17}$$

-continued

Where:

$$Q = \frac{1}{\sqrt{(2\pi)^3 \sigma_{X_A} \sigma_{X_B} \sigma_{X_C}}}$$

$$G = -\frac{1}{2\sigma_{X_A}^2}(\hat{X}_A - X_A)^2 - \frac{1}{2\sigma_{X_B}^2}(\hat{X}_B - X_B)^2 - \frac{1}{2\sigma_{X_C}^2}(\hat{X}_C - X_C)^2$$

Also taking into consecration that the problem is constrained by $$\hat{X}_A = \hat{X}_B \quad (18)$$

$$\hat{X}_A = \hat{X}_C \quad (19)$$

Or $$\hat{X}_A + \hat{X}_B = 2\hat{X}_C \quad (20)$$

Using Lagrange Multiplier to solve this constrained problem, therefore $$L(X, \lambda) = f(X_A, X_B) + \sum_{j=1}^{m} \lambda_j h_j(\hat{X}_A, \hat{X}_B) \quad (21)$$

$$= Qe^G + \lambda_1(\hat{X}_A - \hat{X}_B) + \lambda_2(\hat{X}_A + \hat{X}_B - 2\hat{X}_C)$$

$$\frac{\partial L}{\partial \hat{X}_A} = Qe^G \cdot \frac{\partial G}{\partial \hat{X}_A} + \lambda_1 + \lambda_2 \quad (22)$$

$$= Qe^G \cdot \left(\frac{-1}{\sigma_{X_A}^2}(\hat{X}_A - X_A)\right) + \lambda_1 + \lambda_2$$

$$= 0$$

Similarly, $$\frac{\partial L}{\partial \hat{X}_B} = Qe^G \cdot \frac{\partial G}{\partial \hat{X}_B} - \lambda_1 + \lambda_2 \quad (23)$$

$$= Qe^G \cdot \left(\frac{-1}{\sigma_{X_B}^2}(\hat{X}_B - X_B)\right) - \lambda_1 + \lambda_2$$

$$= 0$$

And $$\frac{\partial L}{\partial \hat{X}_C} = Qe^G \cdot \frac{\partial G}{\partial \hat{X}_C} - 2\lambda_2 \quad (24)$$

$$= Qe^G \cdot \left(\frac{-1}{\sigma_{X_C}^2}(\hat{X}_C - X_C)\right) - 2\lambda_2$$

$$= 0$$

$$\frac{\partial L}{\partial \lambda_1} = \hat{X}_A - \hat{X}_B \quad (25)$$

$$= 0$$

Or $$\hat{X}_A = \hat{X}_B \quad (26)$$

$$\frac{\partial L}{\partial \lambda_2} = \hat{X}_A + \hat{X}_B - 2\hat{X}_C \quad (27)$$

$$= 0$$

Or $$\hat{X}_C = \hat{X}_A \quad (28)$$

Adding (20)+(21) results in $$Qe^G \cdot \left(\left(\frac{-1}{\sigma_{X_A}^2}(\hat{X}_A - X_A)\right) + \left(\frac{-1}{\sigma_{X_B}^2}(\hat{X}_B - X_B)\right) + 2\lambda_2\right) = 0 \quad (29)$$

And adding (22)+(29) results in $$Qe^G \cdot \left(\left(\frac{-1}{\sigma_{X_A}^2}(\hat{X}_A - X_A)\right) + \left(\frac{-1}{\sigma_{X_B}^2}(\hat{X}_B - X_B)\right) + \left(\frac{-1}{\sigma_{X_C}^2}(\hat{X}_C - X_C)\right)\right) = 0 \quad (30)$$

But since $Q e^G \neq 0$, therefore $$\frac{1}{\sigma_{X_A}^2}\hat{X}_A + \frac{1}{\sigma_{X_B}^2}\hat{X}_B + \frac{1}{\sigma_{X_C}^2}\hat{X}_C = \frac{1}{\sigma_{X_A}^2}X_A + \frac{1}{\sigma_{X_B}^2}X_B + \frac{1}{\sigma_{X_C}^2}X_C \quad (31)$$

But $\hat{X}_A = \hat{X}_B = \hat{X}_C$ $$\hat{X}_A = \frac{\frac{1}{\sigma_{X_A}^2}}{\frac{1}{\sigma_{X_A}^2} + \frac{1}{\sigma_{X_B}^2} + \frac{1}{\sigma_{X_C}^2}} X_A + \frac{\frac{1}{\sigma_{X_B}^2}}{\frac{1}{\sigma_{X_A}^2} + \frac{1}{\sigma_{X_B}^2} + \frac{1}{\sigma_{X_C}^2}} X_B + \frac{\frac{1}{\sigma_{X_C}^2}}{\frac{1}{\sigma_{X_A}^2} + \frac{1}{\sigma_{X_B}^2} + \frac{1}{\sigma_{X_C}^2}} X_C \quad (32)$$

From (12) and (32), one can conclude that $$\hat{X}_i = \sum_{j=1}^{N} \frac{\frac{1}{\sigma_{X_i}^2}}{\frac{1}{\sigma_{X_1}^2} + \frac{1}{\sigma_{X_2}^2} + \ldots + \frac{1}{\sigma_{X_N}^2}} X_j \quad (33)$$

Similarly, the final solution for velocity will be $$\hat{V}_i = \sum_{j=1}^{N} \frac{\frac{1}{\sigma_{V_i}^2}}{\frac{1}{\sigma_{V_1}^2} + \frac{1}{\sigma_{V_2}^2} + \ldots + \frac{1}{\sigma_{V_N}^2}} V_j \quad (34)$$

For i=1, 2, ..., N where N is the total number of sensor assemblies contributing to the final solution.

In the following results, several prototypes of a low-cost units containing a sensor assembly, a GNSS receiver and processing means were used for collecting the sensors readings and the GNSS readings in applicable experiments. Although the present method and system does not need all the sensors and systems in this prototype unit (as discussed earlier), they are mentioned in this example just to explain the prototype used. A low-cost prototype unit consisting of a six degrees of freedom inertial unit from Invensense (i.e. tri-axial gyroscopes and tri-axial accelerometer) (MPU-6050), tri-axial magnetometers from Honeywell (HMC5883L), barometer from Measurement Specialties (MS5803), and a GPS receiver from u-blox (LEA-5T) was used.

Figure 3:
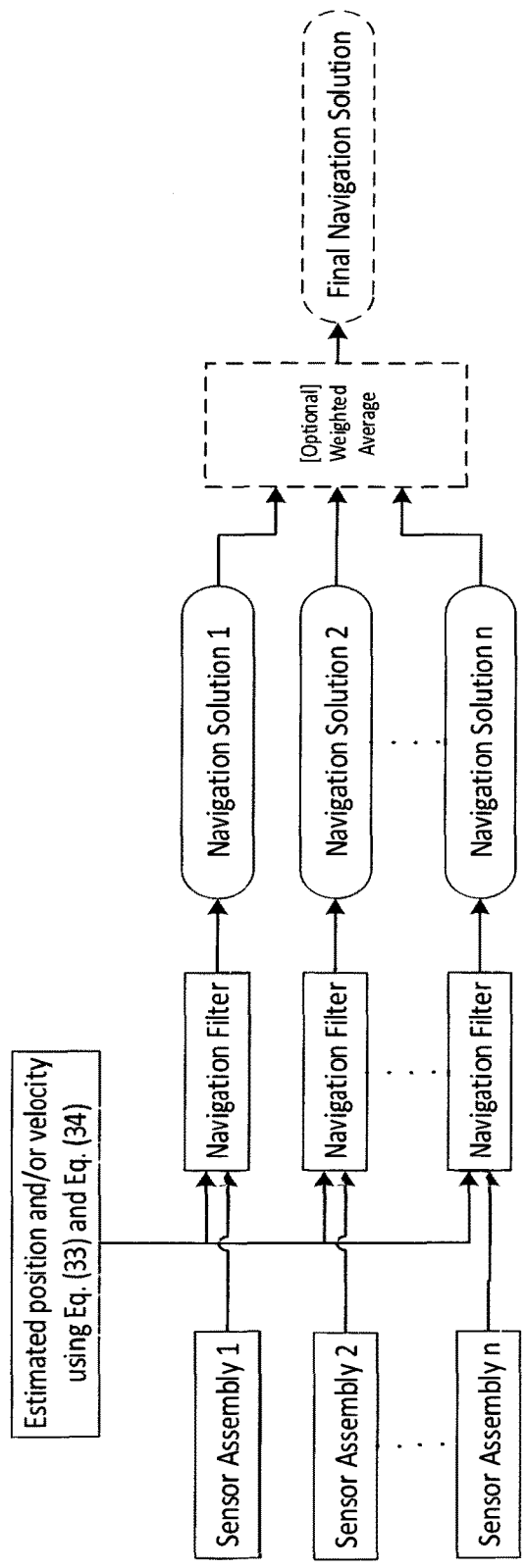
FIG. 3 shows an exemplary block diagram of position and/or velocity aiding or bounding.

In the following results, for demonstration purposes, the statistical model estimation problem is solved using Maximum Likelihood estimator (MLE) and the solution was weighted average of all the current readings of the connected sensor assemblies, weighted by the covariance matrix of each assembly. And the recursive statistical estimator is Kalman filter with decentralized architecture and updated once at a time using the weighted average result of all the sensor assemblies. An exemplary block diagram of position and/or velocity aiding or bounding is shown in FIG. 3.

Example 1 (a)—Driving

Figure 4:
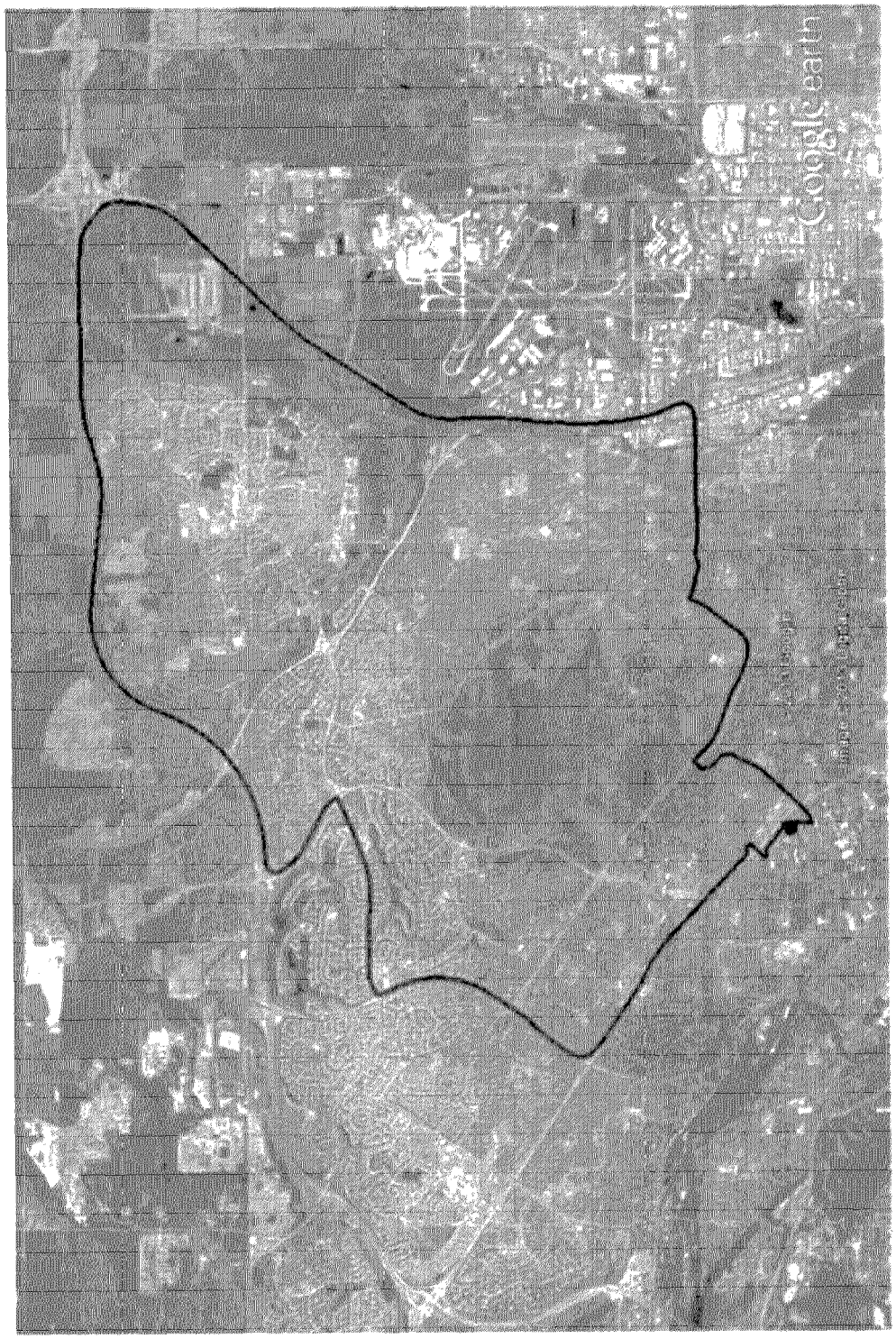
FIG. 4 shows a first vehicle trajectory overall GPS on a map.
Figure 5:
FIG. 5 shows each device solution vs. GPS vs. the proposed method solution after a zoom-in on a GPS outage in the first vehicle trajectory on a map.
Figure 6:
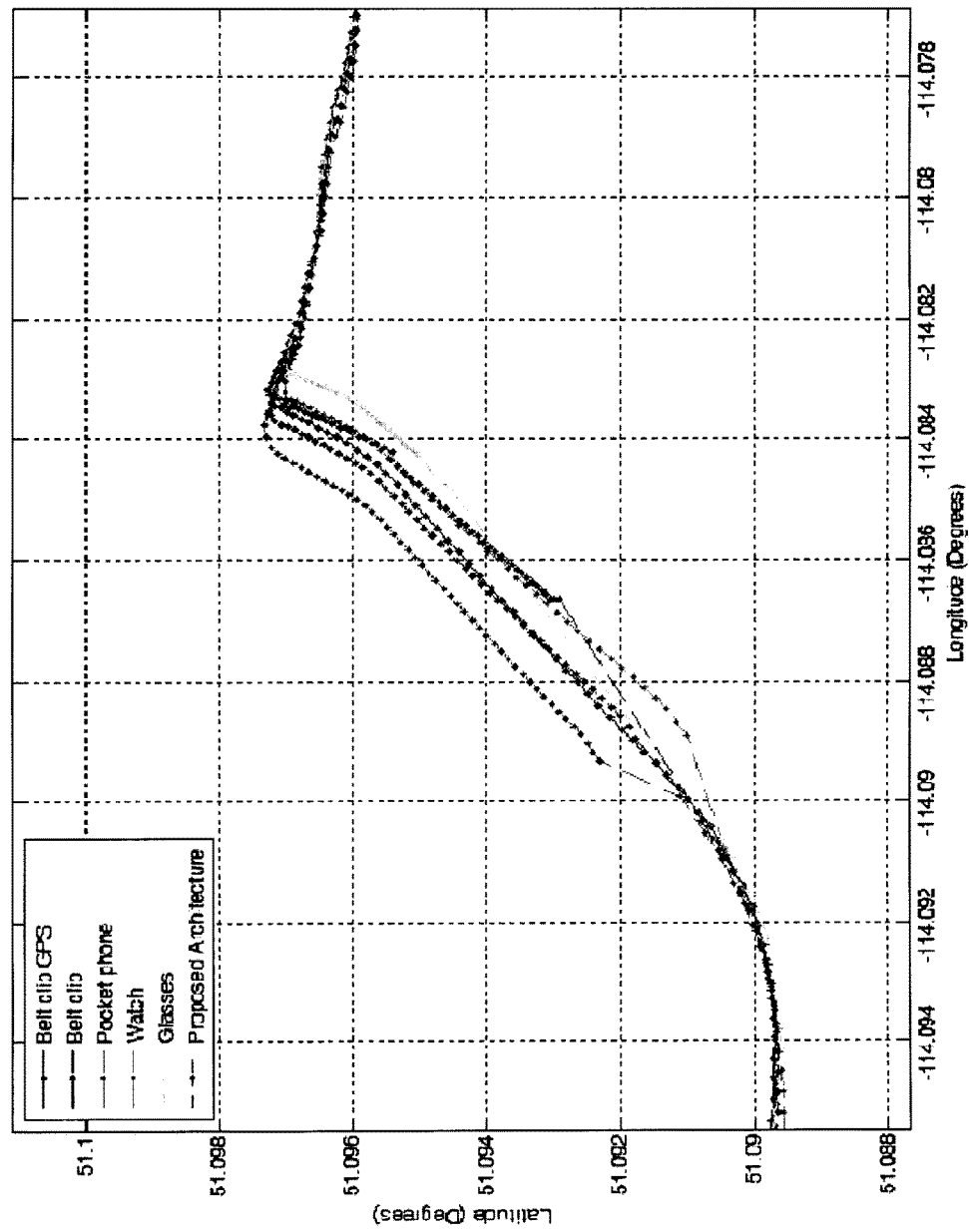
FIG. 6 shows the same outage shown in FIG. 5 but as a graph instead of on a map for illustrating more the jump in both smart glasses and belt clip solutions.

For demonstration purposes, different number of devices were used in testing the proposed method. In the first trajectory, four devices were used, a free (non-strapped) device to emulate a smart phone, a device strapped to the wrist to emulate a smart watch, a device in a belt clip to emulate an electronic belt clip, and a device strapped to a glass-like head mount to emulate a glasses were used in testing the proposed method. In the first vehicle trajectory, all four devices were used, and the smart phone was in a pocket all the time. One GPS outage was introduced, 60 seconds in duration. As shown in FIGS. 4, 5, and 6, the proposed method is the closest solution to the reference (GPS).

Figure 7:
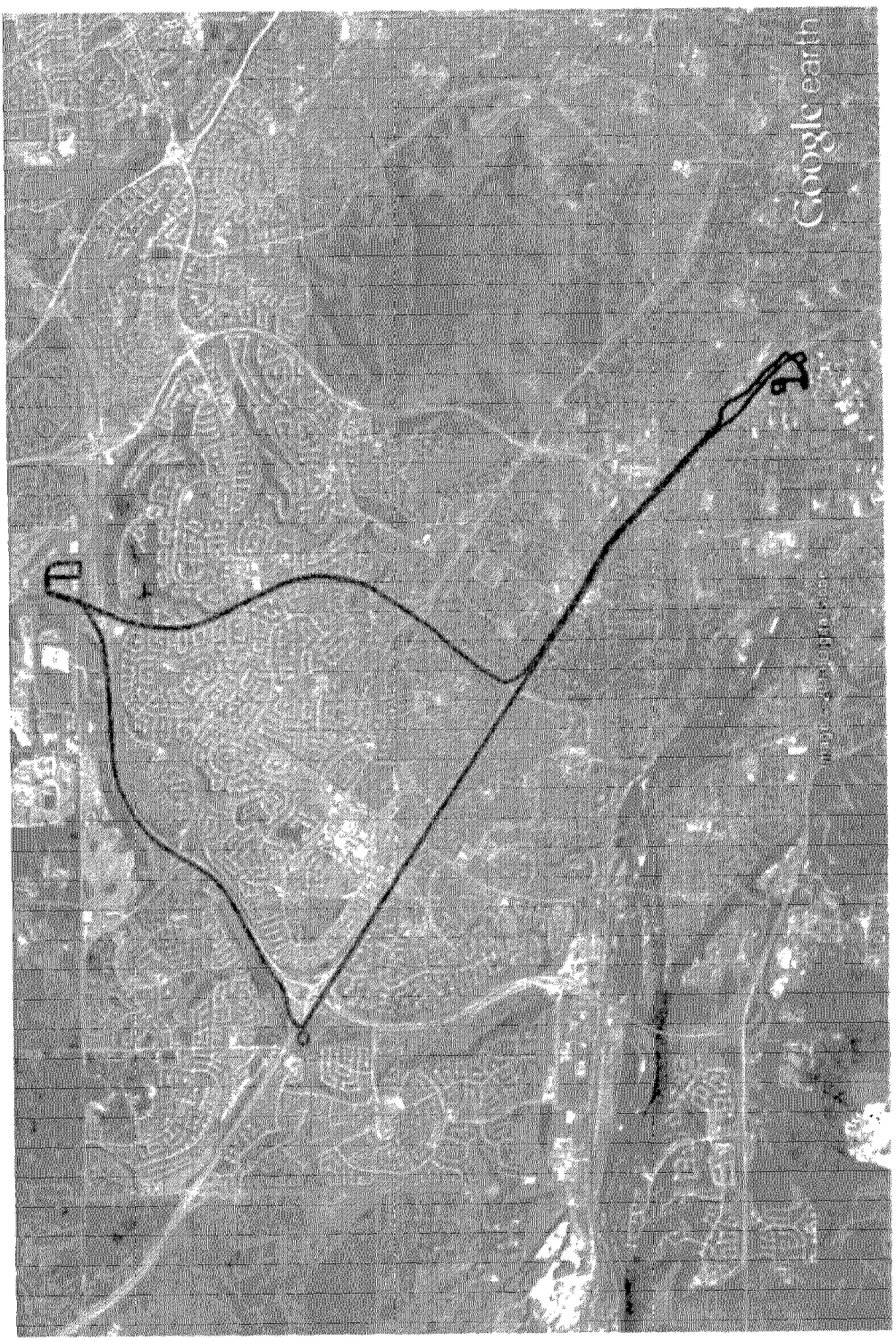
FIG. 7 shows a second vehicle trajectory overall GPS on a map.
Figure 8:
FIG. 8 shows each device solution vs. GPS vs. the proposed method solution after a zoom-in on a GPS outage in the second vehicle trajectory on a map.
Figure 9:
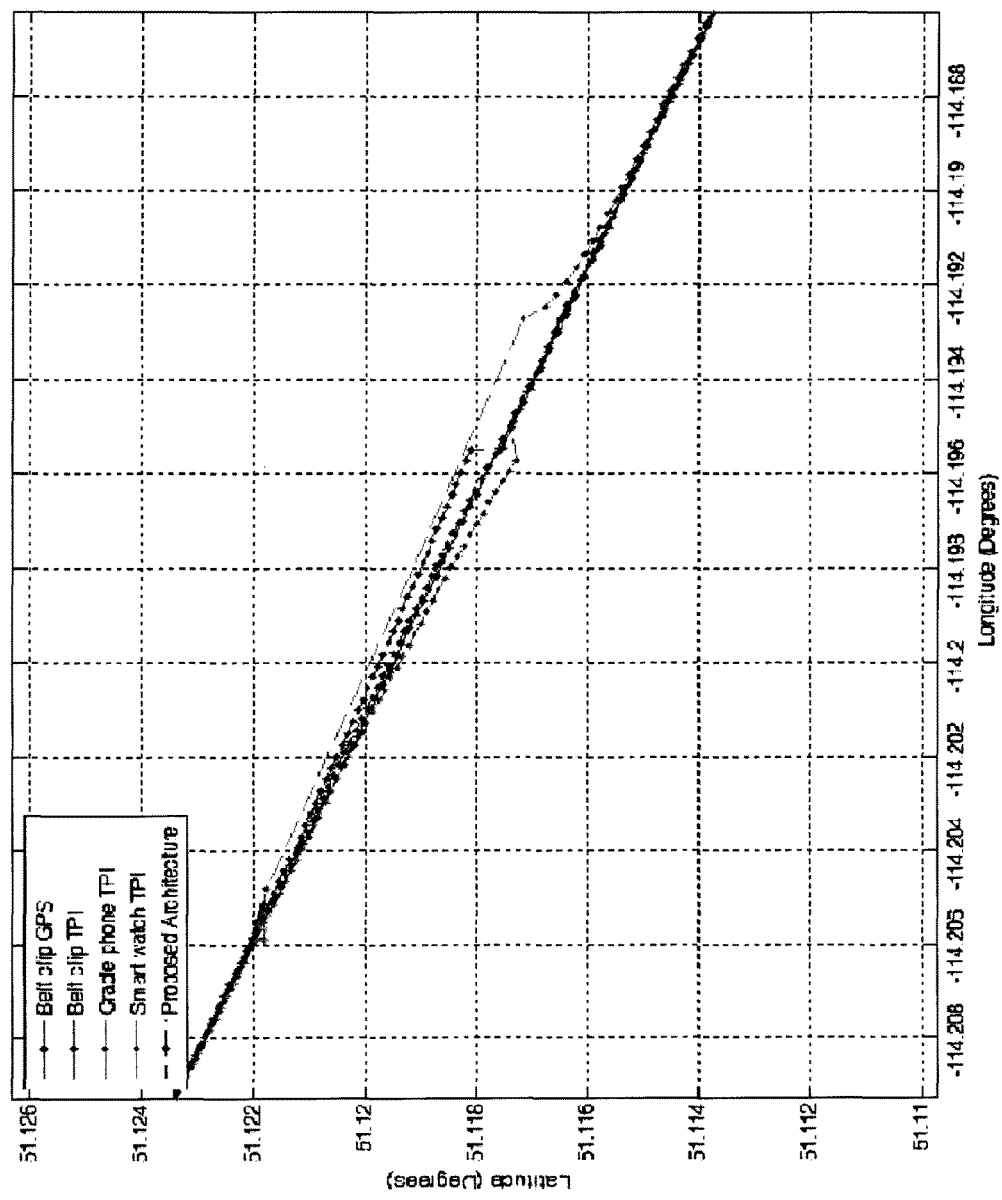
FIG. 9 shows the same outage shown in FIG. 8 but as a graph instead of on a map for illustrating more the jump in smart watch solution.

In the second vehicle trajectory, three devices only were used—the smart phone, smart watch, and the belt clip—and the smart phone was in a cradle all the time. One GPS outage was introduced, 60 seconds in duration. As shown in FIGS. 7, 8, and 9, the proposed method significantly improves the overall performance.

Figure 10:
FIG. 10 shows a third vehicle trajectory overall GPS on a map vs. the proposed method solution.
Figure 11:
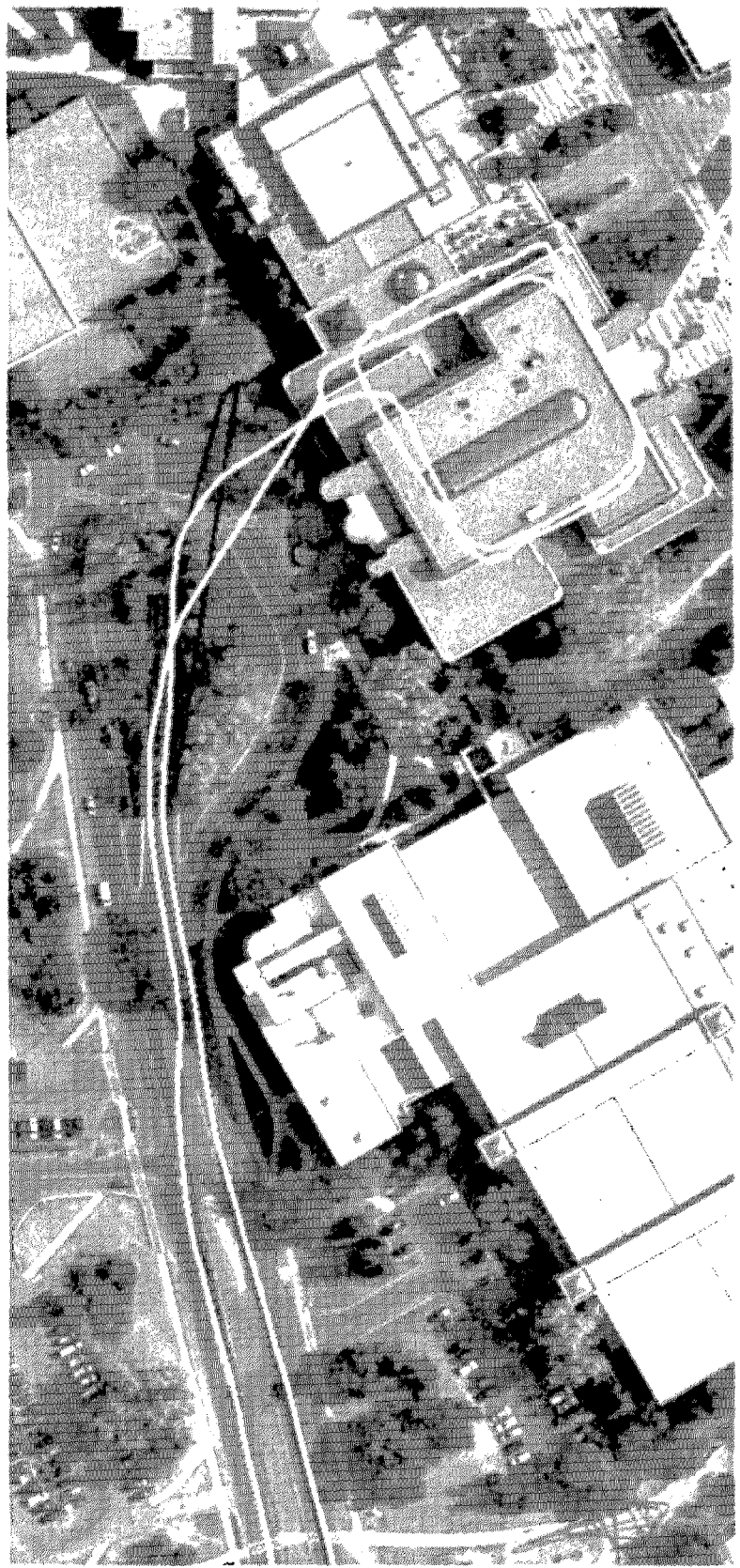
FIG. 11 shows the smart phone solution after zoom-in on the parkade area in the third vehicle trajectory.
Figure 12:
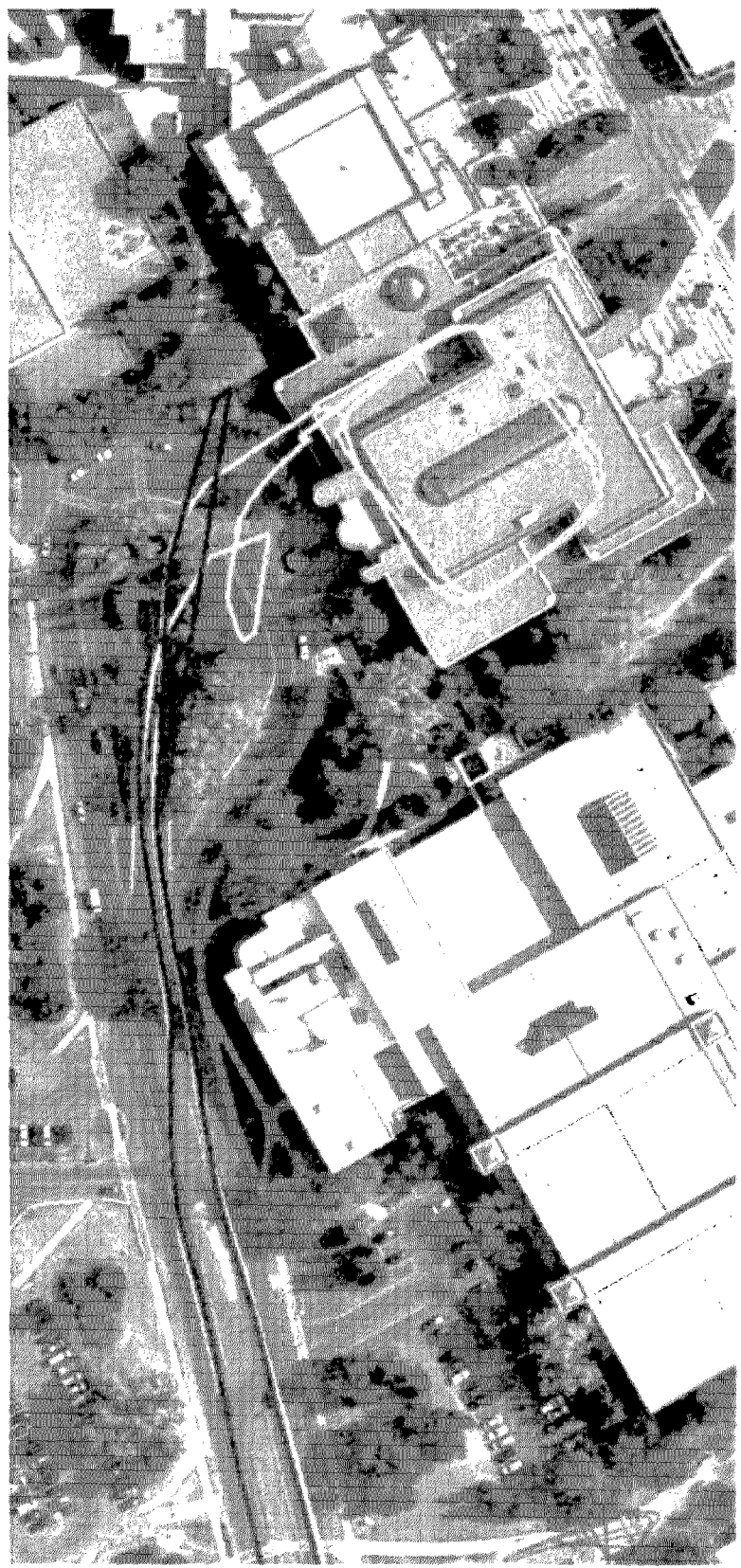
FIG. 12 shows the smart glasses solution after zoom-in on the parkade area in the third vehicle trajectory.
Figure 13:
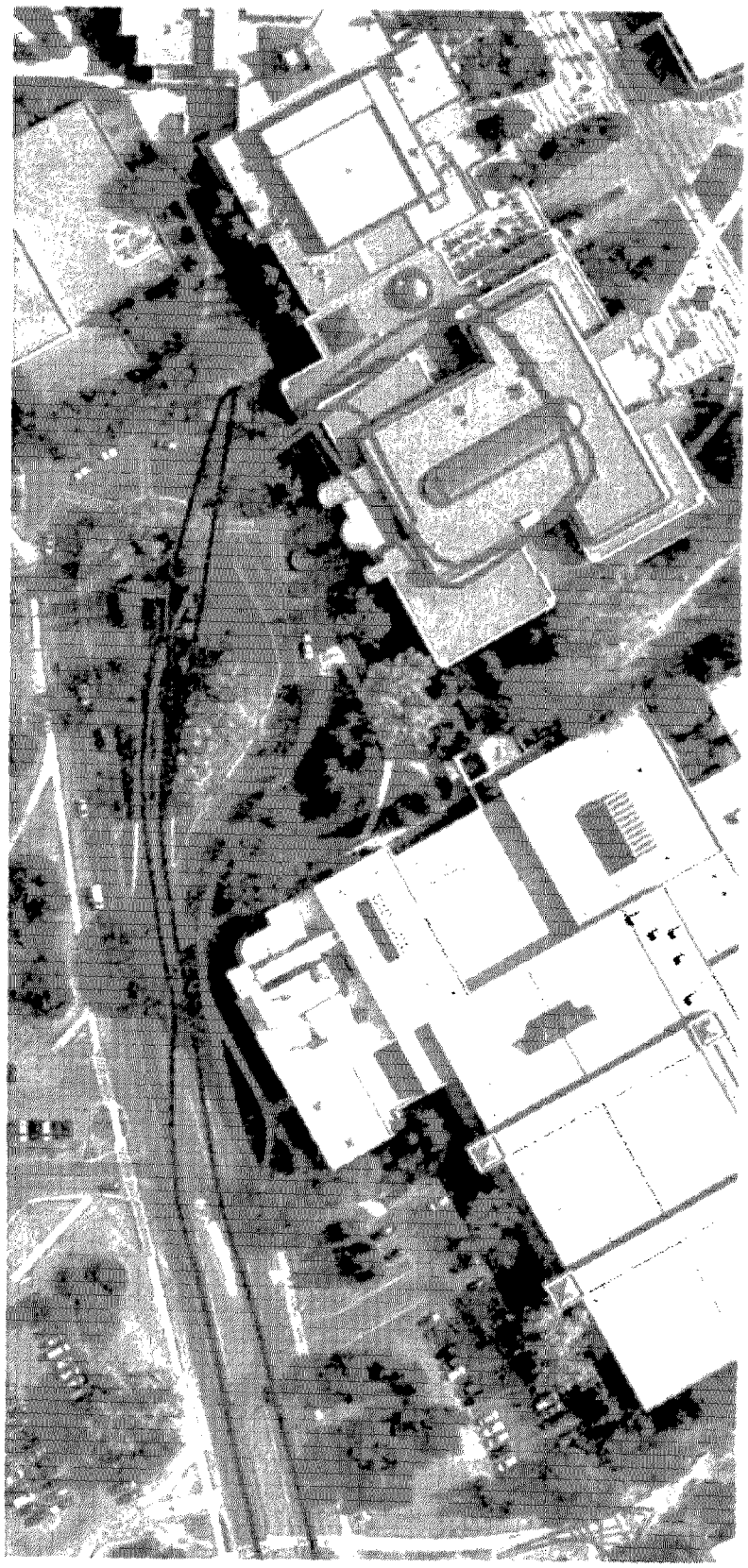
FIG. 13 shows the proposed method solution after zoom-in on the parkade area in the third vehicle trajectory.
Figure 14:
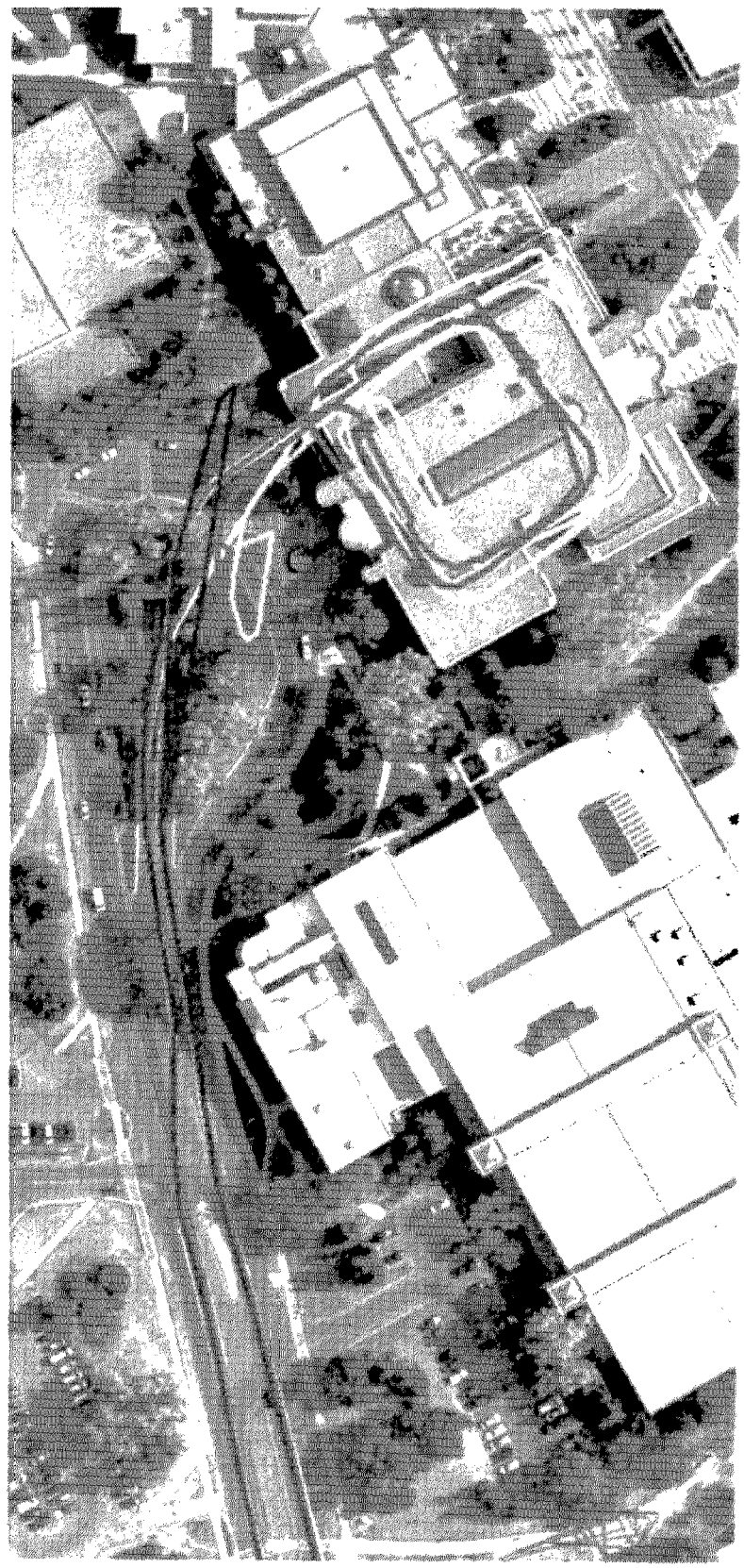
FIG. 14 shows the overlay of all solutions after zoom-in on the parkade area in the third vehicle trajectory for the seek of comparison.

In the third vehicle trajectory, two devices only were used—the smart phone, and the smart glasses. FIG. 10 shows the whole trajectory, both the GPS and the proposed method solution coincide on each other for most of the trajectory except for the part in the bottom of the figure where the user enters an underground parkade and loses the GPS signal. The smart phone solution is shown in FIG. 11. The overall solution shape is correct except for two overshoots, one in the beginning of the entrance of the parkade while the second one towards the side which is pointing North-East. This led to the shift in the position of the solution. One more problem with the phone solution is the undershoot of the position solution at the parkade exist, which can be seen through the jump in the solution near the exist of the parkade and towards the GPS solution once it became available again. FIG. 12 shows the glasses solution. The solution has a drift problem, most apparent towards the exit of the parkade since both the entrance and the exit of the parkade are close and parallel to each other. FIG. 13 shows the solution of the proposed method. The proposed method solution does not have the shift problem found previously in the position solution of the phone neither have the jump near the exit of the parkade. In addition, the proposed method solution does not have the problem of the drift found in the glasses solution which make it better than both devices solution as illustrated in FIG. 14 where all solutions are plotted on each other for the seek of comparison.

Example 1 (b)—Walking Indoors

Figure 15:
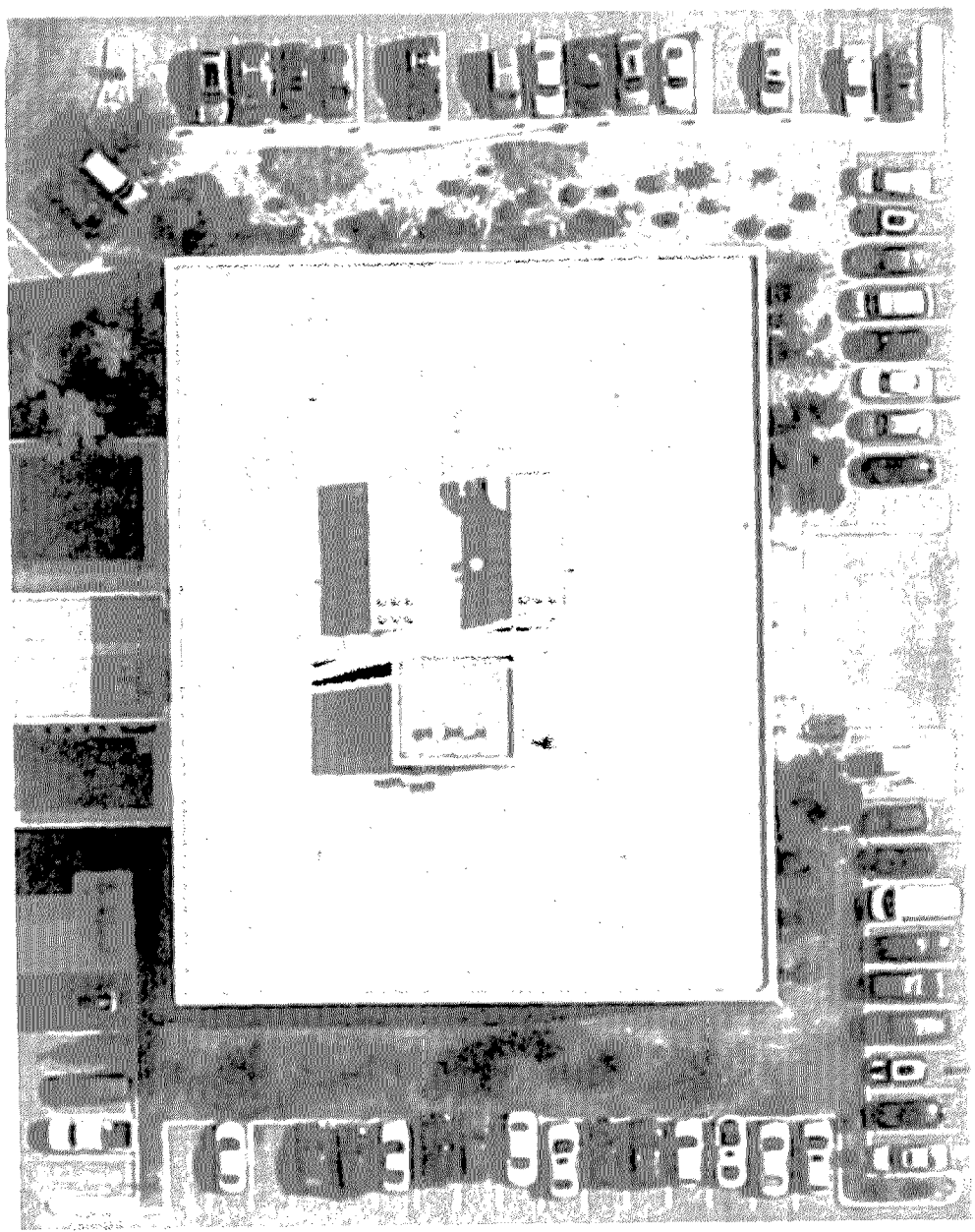
FIG. 15 shows the smart phone solution in the first walking trajectory.
Figure 16:
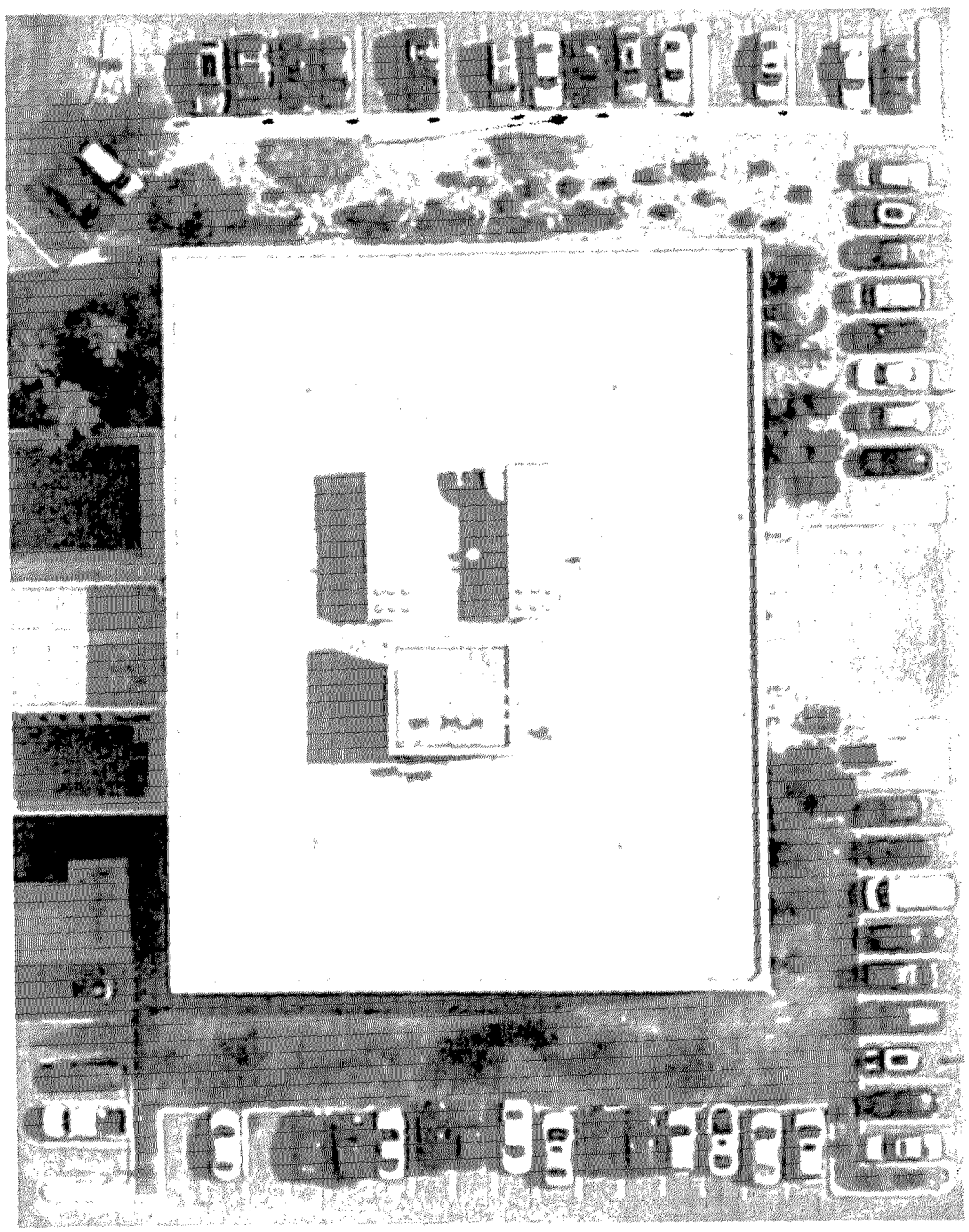
FIG. 16 shows the smart watch solution in the first walking trajectory.
Figure 17:
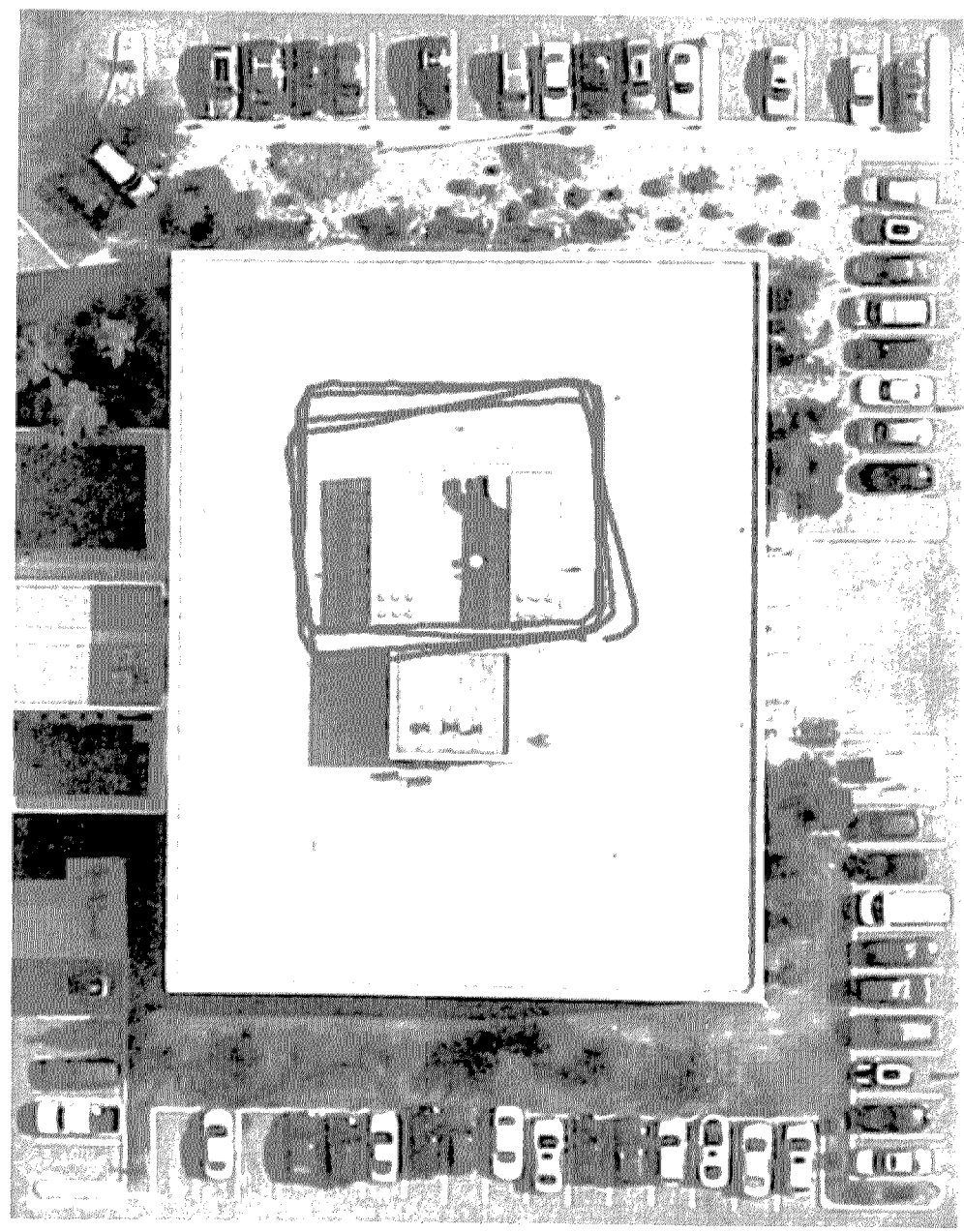
FIG. 17 shows the proposed method solution in the first walking trajectory.

For demonstration purposes, a free (non strapped) device to emulate a smart phone, a device strapped to the wrist to emulate a smart watch, and a device strapped to a glass-like head mount to emulate a glasses were used in testing the proposed method. In the first example walking trajectory, two devices only were used: a smart watch and a smart phone, both in viewing (or compass) mode while the user is walking in four loops indoors. The smart watch and the smart phone solutions are shown in FIGS. 15 and 16 respectively. As FIG. 15 illustrates, the smart watch solution is suffering from some drift which cause the solution to rotate in the clockwise direction. On the other hand, FIG. 16 illustrates a similar drift in the smart phone solution but in the opposite (counter-clockwise) direction. FIG. 17 shows the proposed method solution. It shows how integrating both devices solution significantly improves the final solution.

In the second example trajectory, a more challenging scenario is presented. Three devices were used: a smart watch, a smart phone, and smart glasses. However, in this trajectory, the same hand having the smart watch held the smart phone, and both experienced different use cases. The trajectory consists of four loops indoors, where in each, the user changes the position of the smart phone; and consequently the smart watch, and put it in a different position than the previous loop. In the first loop, the user starts with the handheld portrait position, then dangling in the second loop, then ear in the next one, and finally, handheld landscape in the last loop.

Involving four different use cases for the smart phone and changing the use case each loop shows how challenging this trajectory is, yet very close to real life smart phone daily usage scenario. Users commonly hold the smart phone in the handheld portrait use case when he/she is trying to navigate to some place inside a building, and switch to dangling while walking for long straight lines or after recognizing his/her path he/she needs to follow to reach the destination. In addition, users may wish to use the smartphone in the handheld landscape use case to send a message, or switching back and forth to handheld portrait if he/she lost their path and want to use the navigation application again or finally, making or receiving a call while walking as emulated with the ear use case.

Figure 18:
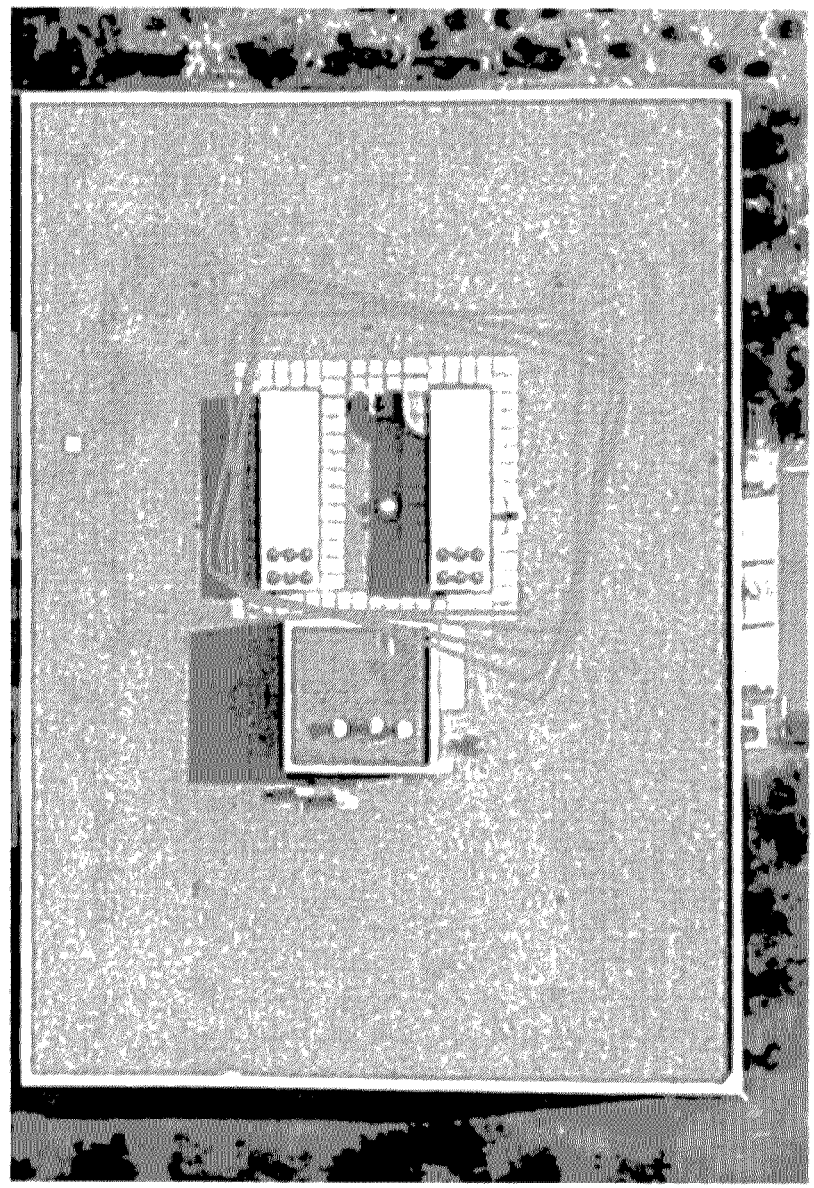
FIG. 18 shows the smart glasses solution in the second walking trajectory.
Figure 19:
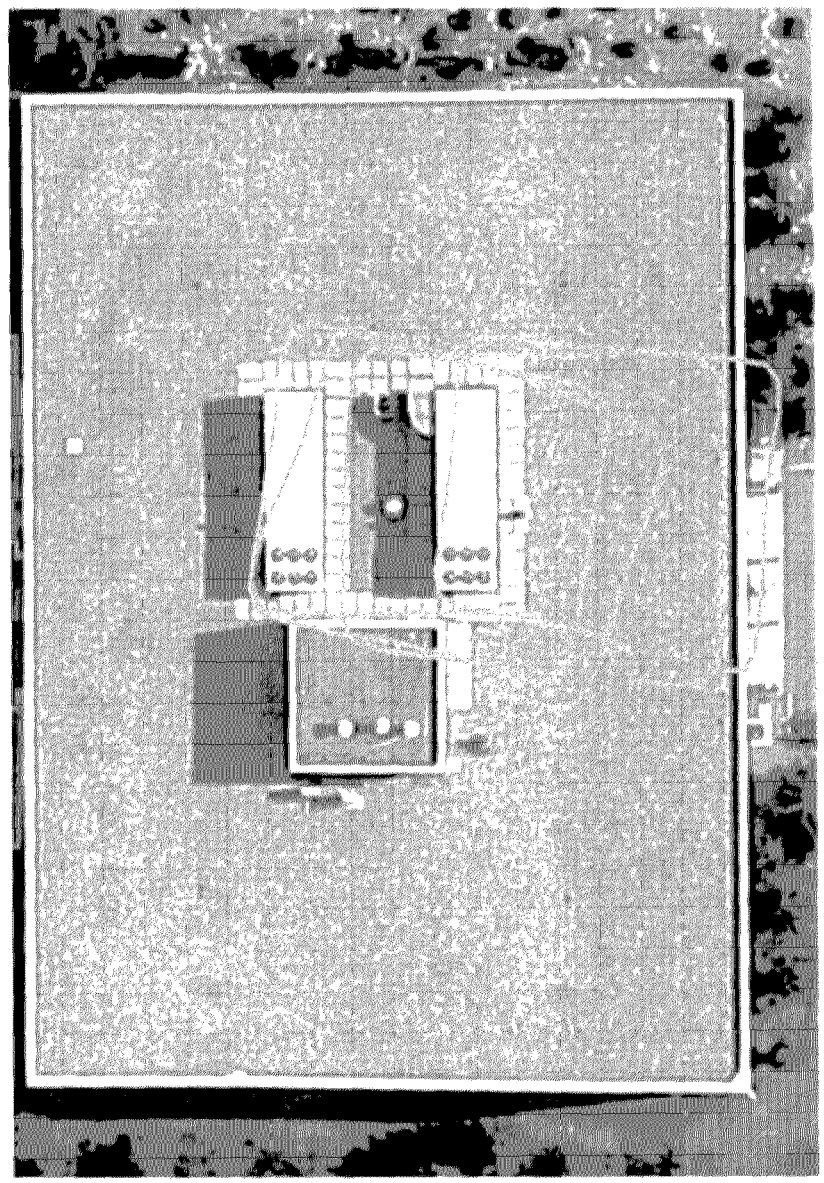
FIG. 19 shows the smart phone solution in the second walking trajectory.
Figure 20:
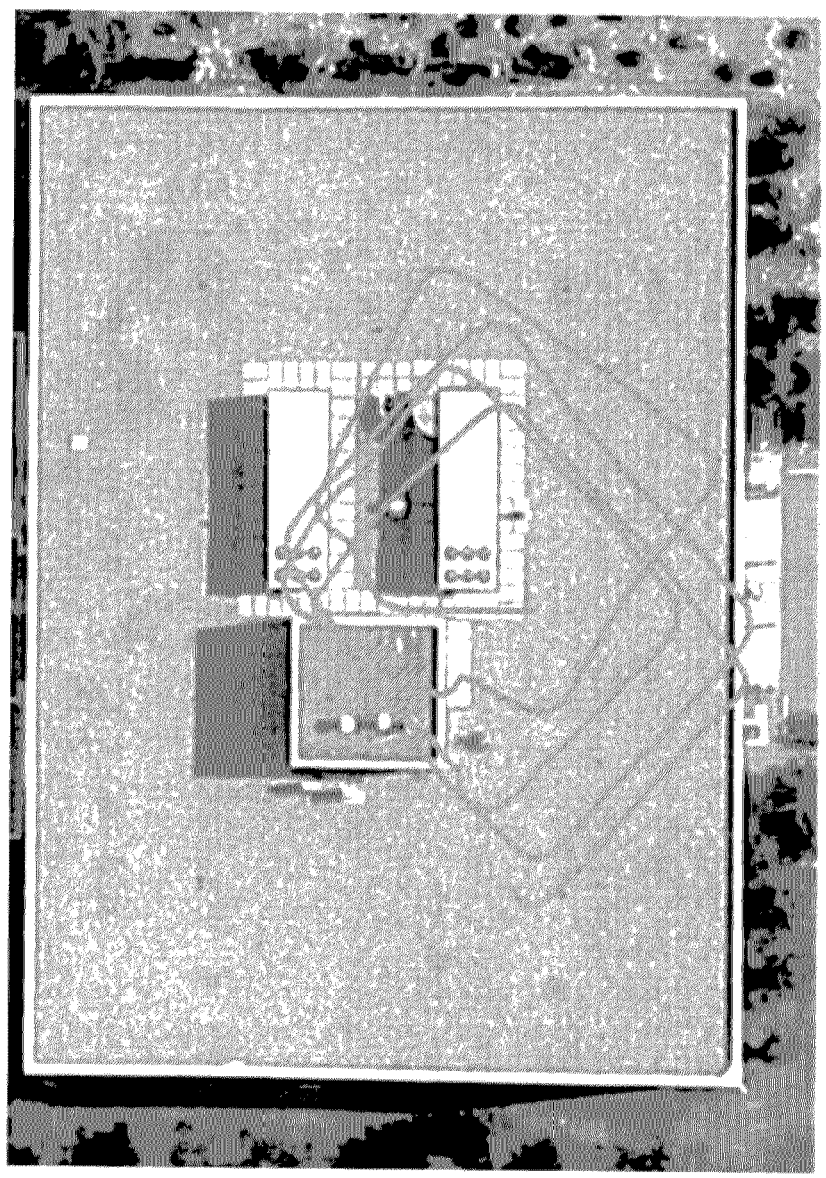
FIG. 20 shows the smart watch solution in the second walking trajectory.

FIGS. 18 to 20 show the navigation solution of each device alone, starting with the smart glasses device in FIG. 18, then free moving smart phone in FIG. 19, and finally, the free moving smart watch in FIG. 20.

Sometimes the standalone device solution is good, in terms of tracking the shape of the trajectory, but the heading drifts as in the case of the glasses as shown in FIG. 18. Other times, the situation is more challenging, as in the case of the smart phone and the smart watch as shown in FIGS. 19 and 20 respectively, and this was expected as the user keeps on changing the smartphone use case after each loop.

Figure 21:
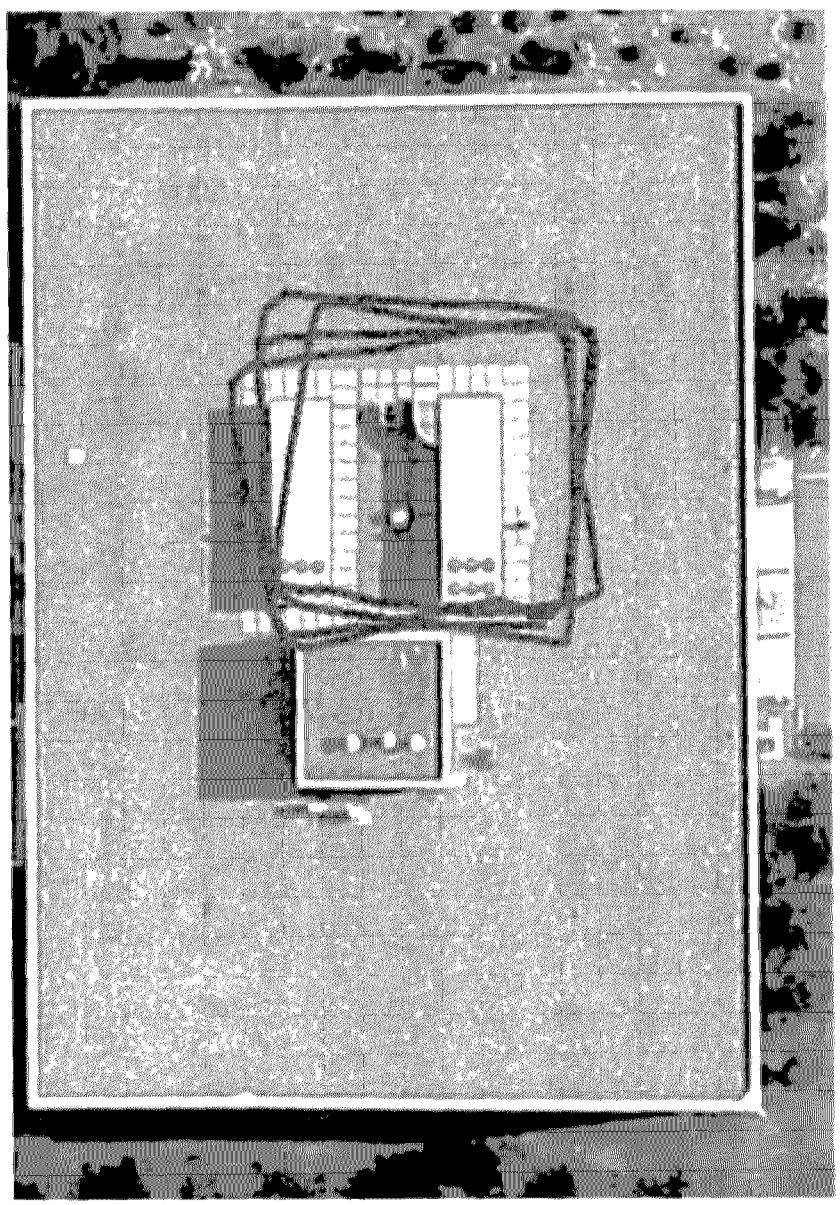
FIG. 21 shows the proposed method solution in the second walking trajectory.

The proposed method solution is shown in FIG. 21, and as it is shown, the proposed method solution is the best among all other devices' solutions which are depending on the embedded set of sensor assemblies in each device alone.

Figure 22:
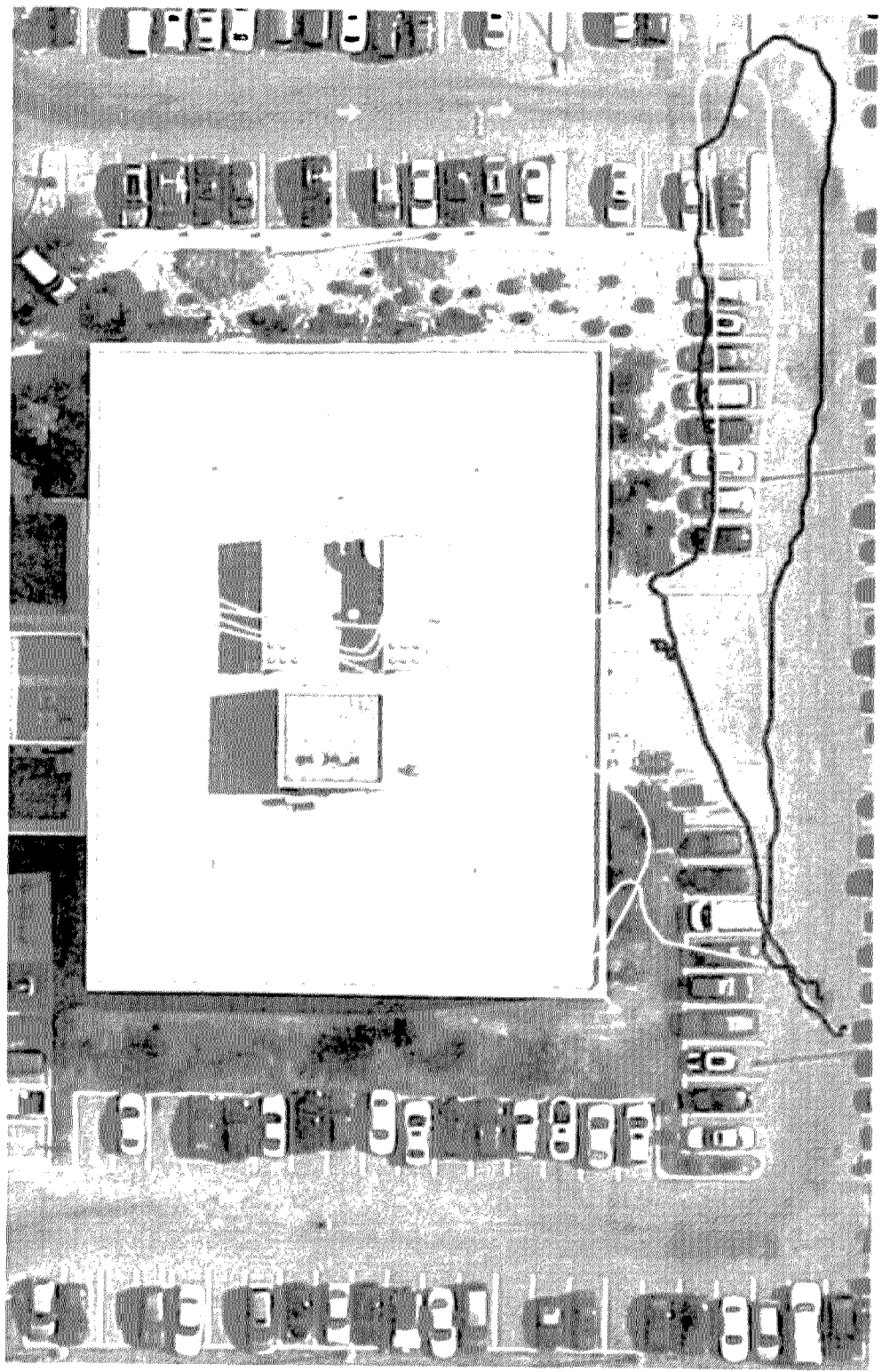
FIG. 22 shows the smart glasses solution vs. GPS in the third walking trajectory.
Figure 23:
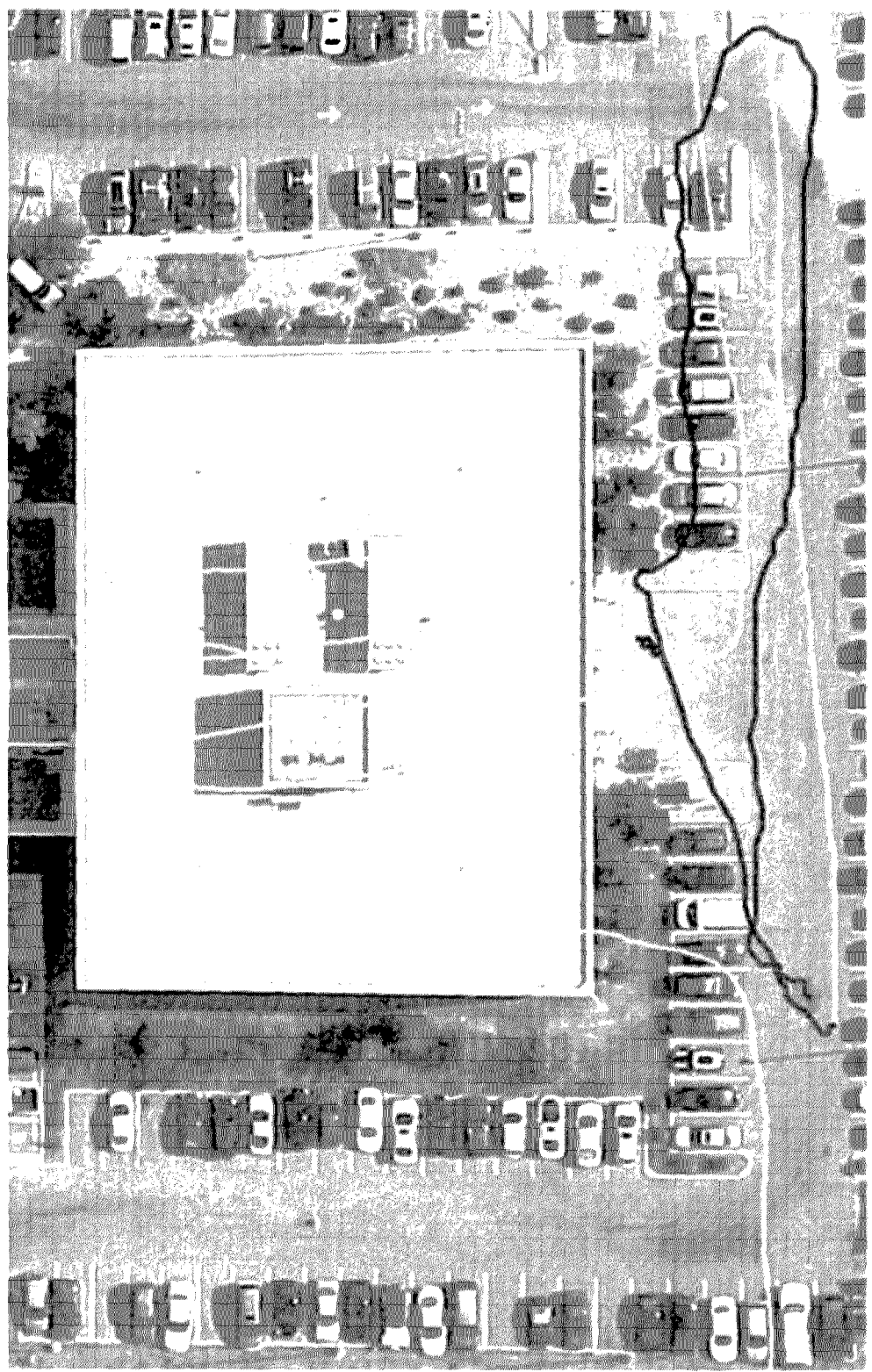
FIG. 23 shows the smart watch solution vs. GPS in the third walking trajectory.
Figure 24:
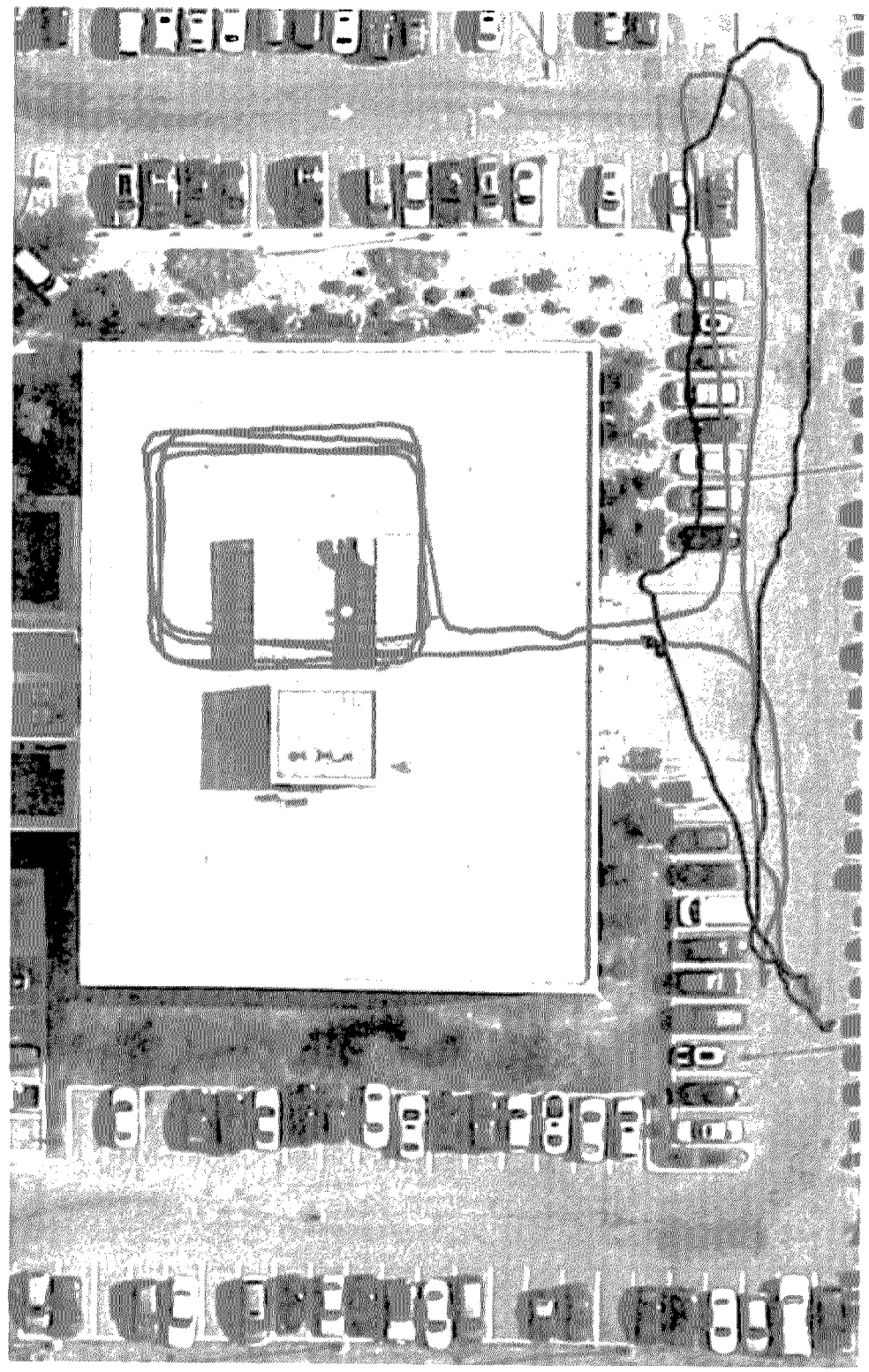
FIG. 24 shows the proposed method solution vs. GPS in the third walking trajectory.
Figure 25:
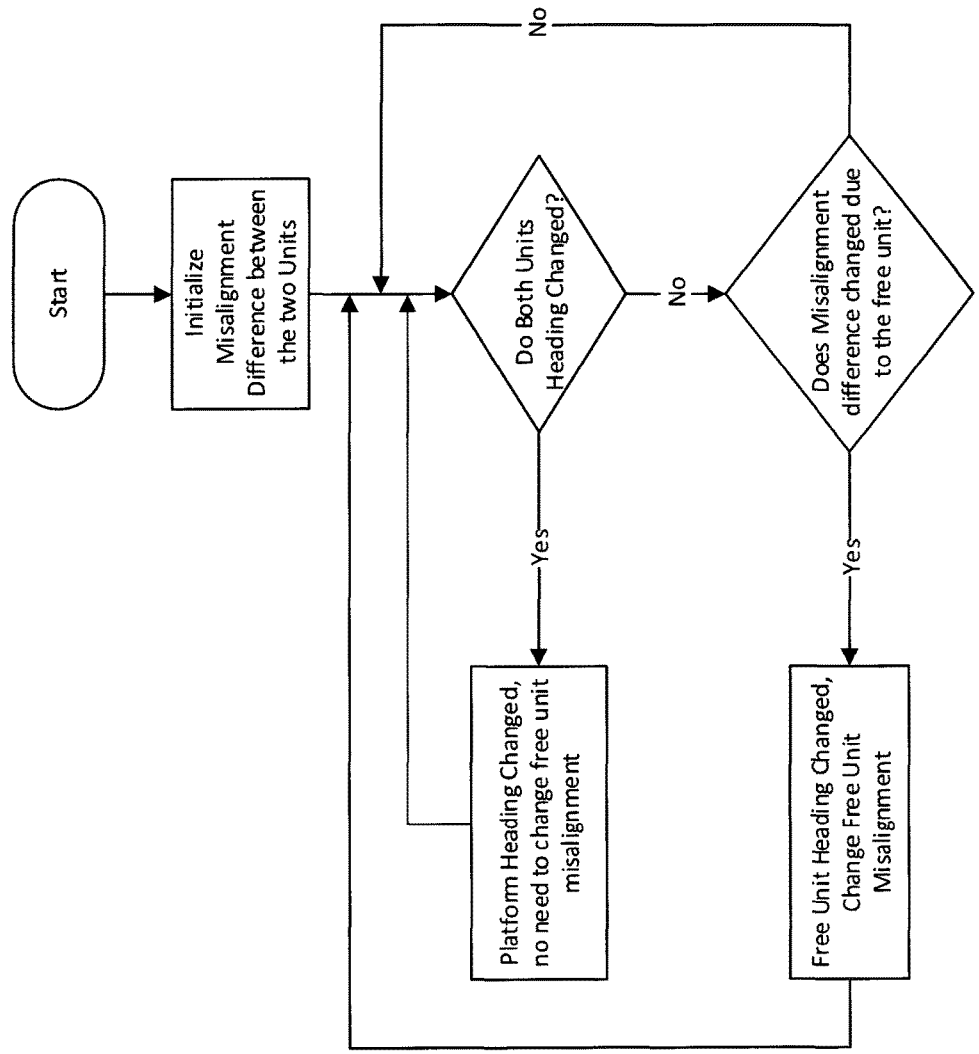
FIG. 25 shows the new misalignment method flow chart.
Figure 26:
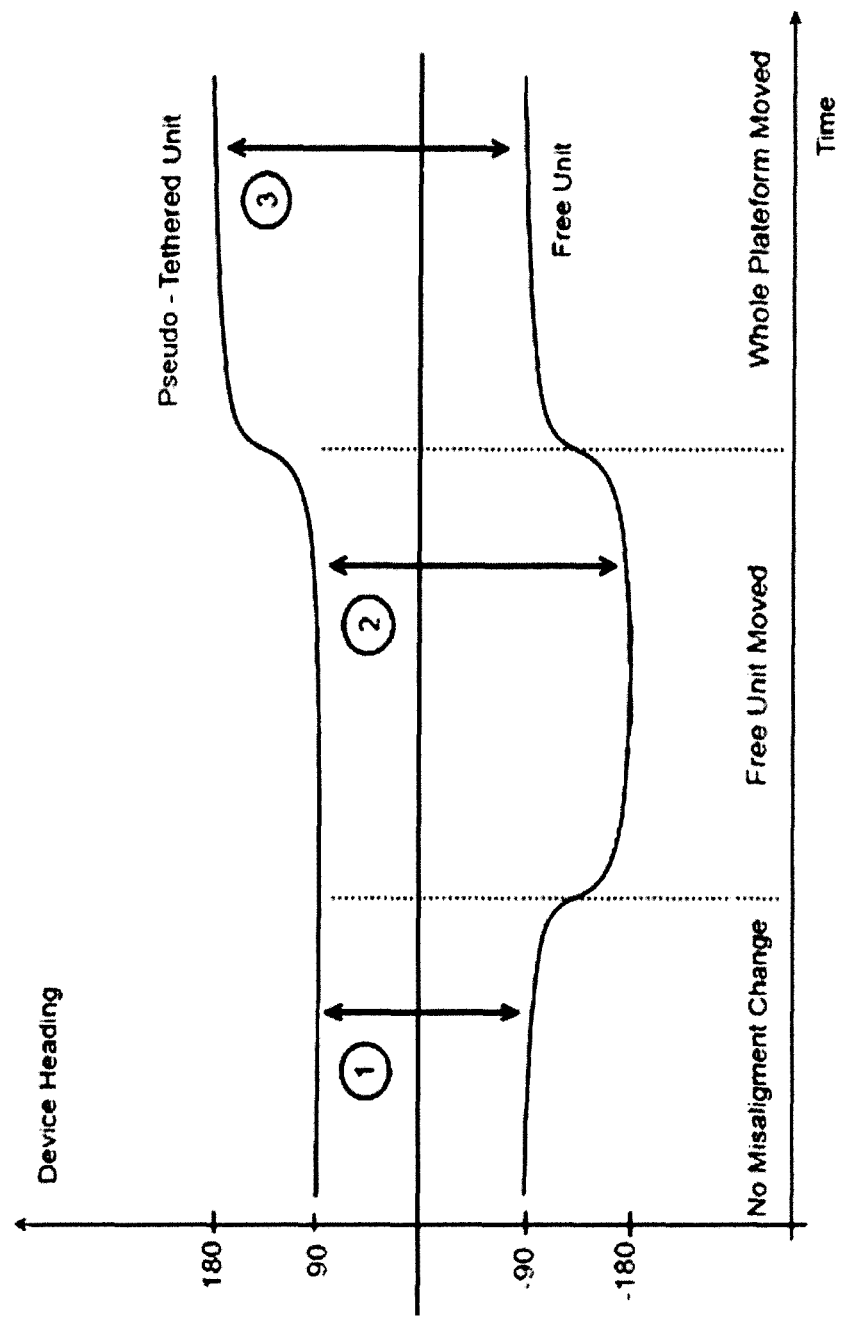
FIG. 26 shows an example on the flow chart different cases shown in FIG. 25.

In the third trajectory, an Outdoors/Indoors mixed example is presented. Two devices were used, smart glasses and a smart watch. The hand that had the smart watch was dangling during this trajectory. The user starts navigation outdoors where GPS signal is available, and then switch to indoors environment where he loses the GPS signal. FIG. 22 shows the smart glasses device solution alone, while FIG. 23 shows the smartwatch device solution alone. FIG. 24 shows the proposed method vs GPS. As shown in FIGS. 22-24 the GPS solution is not available indoors, while the integrated navigation solution is available in both indoors and outdoors. Furthermore, as shown in FIG. 24, integrating multiple sensor assemblies further enhances the integrated solution calculated by each sensor assembly found in each device alone.

Example 2—Enhancing the Navigation Solution of at Least One of the Devices by Using Multiple Sensor Assemblies for Estimating Misalignment of at Least One of the Devices This example demonstrates the calculation of misalignment using multiple sensor assemblies (such as sensor assemblies found in most of today's electronic gadgets, e.g. smart phones or smart watches). The present method may be used with two or more of sensor assemblies.

In this example, one sensor assembly (found in a device or appcessory) is used in estimating the misalignment of another sensor assembly. In other words, by knowing the heading and misalignment of at least one sensor assembly, this information can be exploited and be used in estimating the free (non-strapped) sensor assembly misalignment relative to the platform heading, and which is usually harder to be estimated using the free sensor assembly alone.

In a preferred example the strapped (tethered) or pseudo-tethered sensor assembly is found in a belt clip or chest-mounted fitness appcessory worn by the user and the other free sensors assemblies are found in a smart phone, smart glasses, and/or smart watch. The new misalignment method can be best described using the flow chart in FIG. 17.

Where initially, the misalignment between at least two sensor assemblies (the strapped (tethered) or pseudo-tethered sensor assembly, and another one which it is desired to calculate its misalignment) is known, next is tracking any changes in the misalignment difference between the two sensor assemblies, if there is a difference change, and no change in the strapped (tethered) or pseudo-tethered sensor assembly heading, then this change is due to the change in the free sensor assembly heading, else, if the heading of both sensor assemblies is changing, then this change is due to platform heading change, else, remain tracking misalignment difference till any change occurs. In FIG. 18, an example on each case described in the flow chart in FIG. 17.

This flow chart can be interpreted in terms of mathematical equation as follow $$M_{FD} = H_{FD} - H_{TD} + M_{TD} \quad (35)$$

Where:
$M_{FD}$: Misalignment of free device
$H_{FD}$: Heading of free device
$M_{TD}$: Misalignment of tethered or pseudo-tethered device
$H_{TD}$: Heading of tethered or pseudo-tethered device The new estimated misalignment can be farther enhanced using some post-processing step (such as using Low-Pass Filter (LPF) or moving average). A comparison of different possible post-processing techniques is held and results are shown in the following example section.

A large number of datasets were collected for testing and verification. These datasets were collected by different users of different age, gender, and characteristics. The datasets were collected using two or more sensors assemblies in devices carried at different positions on users' body such as on waist, on wrist, on head, on chest, handheld, in pocket, and on ear. The results were analyzed, and they clearly demonstrated that a much reliable and more accurate navigation solution can be obtained by integrating multiple sensors assemblies found in many devices carried by current electronic gadgets' users.

To sum up, a major factor that distinguishes the proposed solution from other traditional inertial navigation solutions is that it exploits the connection already present between most of today's electronic gadgets carried by the same user most of the time, either wearable computing device, portable devices or appcessories and each other, and integrate all the information coming from these connected network of multiple sensors assemblies, and provide a final enhanced navigation solution which is reliable and accurate in the different environments indoors or outdoors in open sky or urban canyon, whether on foot or driving.

Example 2 (a)—Misalignment Calculation in Driving

For demonstration purposes, a free device to emulate a smart phone, a device strapped to the wrist to emulate a smart watch, a device in a belt clip to emulate an electronic belt clip, and a device strapped to a glass-like head mount to emulate a glasses were used in testing the proposed method.

Figure 27:
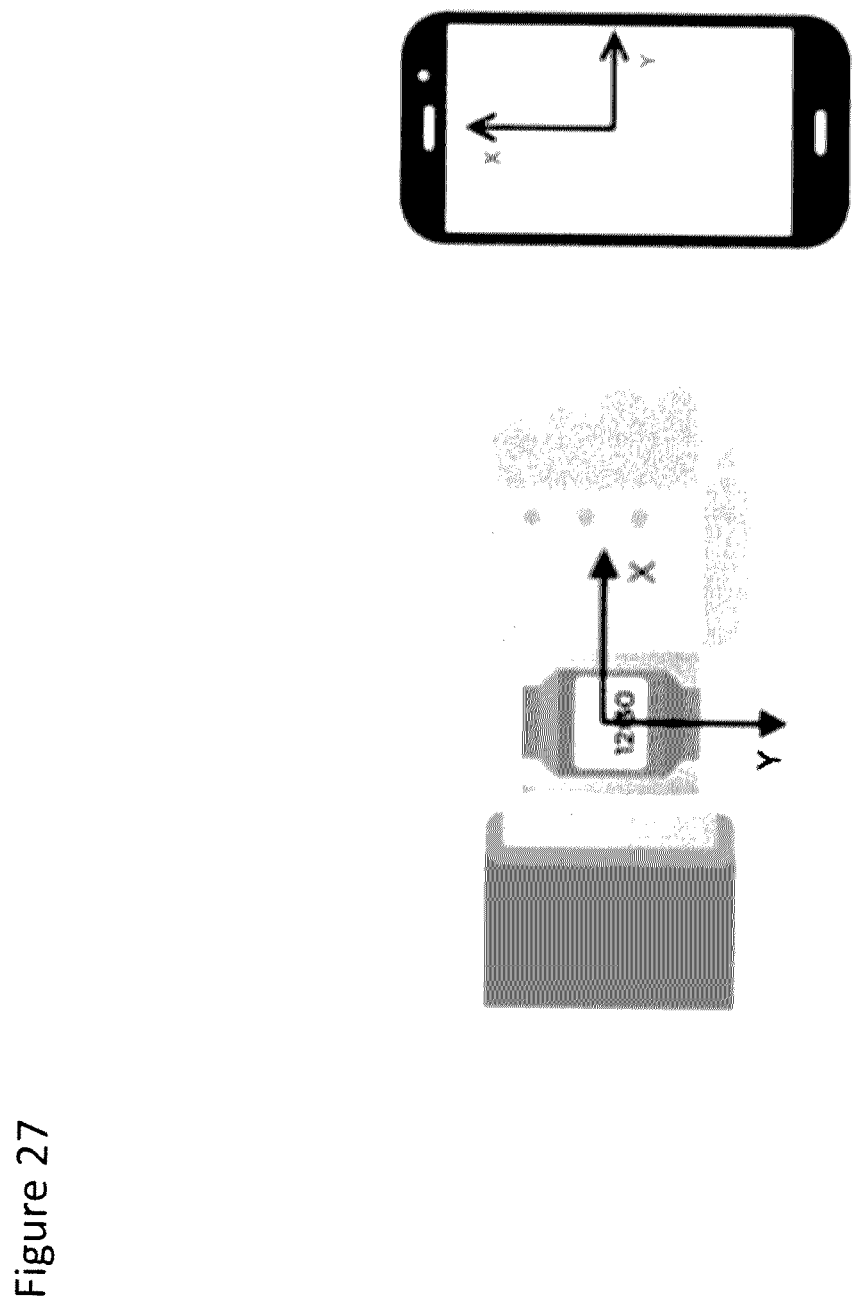
FIG. 27 shows the first emulated smartwatch (left) and smartphone (right) sensitive axes definition.

Results from two different driving trajectories are presented here. In both trajectories the user was setting beside the driver. In the first trajectory, three devices were used, a belt clip, smart watch, and smart glasses. And the user was asked to act as normal as he can, i.e. looking naturally to the right and left, and looking at the watch from time to time. While in the second trajectory, besides the belt clip, a more focus was concentrated on smart phone in different use case, such as: on seat, on ear, in handheld portrait, in a cup holder, and in pocket. The sensitivity axes of the inertial sensors included in the smart phone and the smart watch are shown in FIG. 27. While the sensitivity axes of the electronic belt clip and smart glasses are similar to that of the smart phone.

Ideally, in the first trajectory, the misalignment of both, the smart watch and the smart glasses should be around zero. However, the user cannot fix his hand or his head so that the misalignment be exactly zero. In fact, this is one of the main objectives of the proposed method which is not forcing any constraints on how the user carry or use any device. Therefore, we should expect the results to be around the zero (as in the ideal case) except when the user is looking at his smart watch to know the time. In this case and according to the sensitivity axes of the smart watch shown in FIG. 27, we should expect the misalignment angle to be around 90°. Similarly, in the case of smart glasses, we should expect zero misalignment most of the time except when the user looks towards the right or the left.

Figure 29:
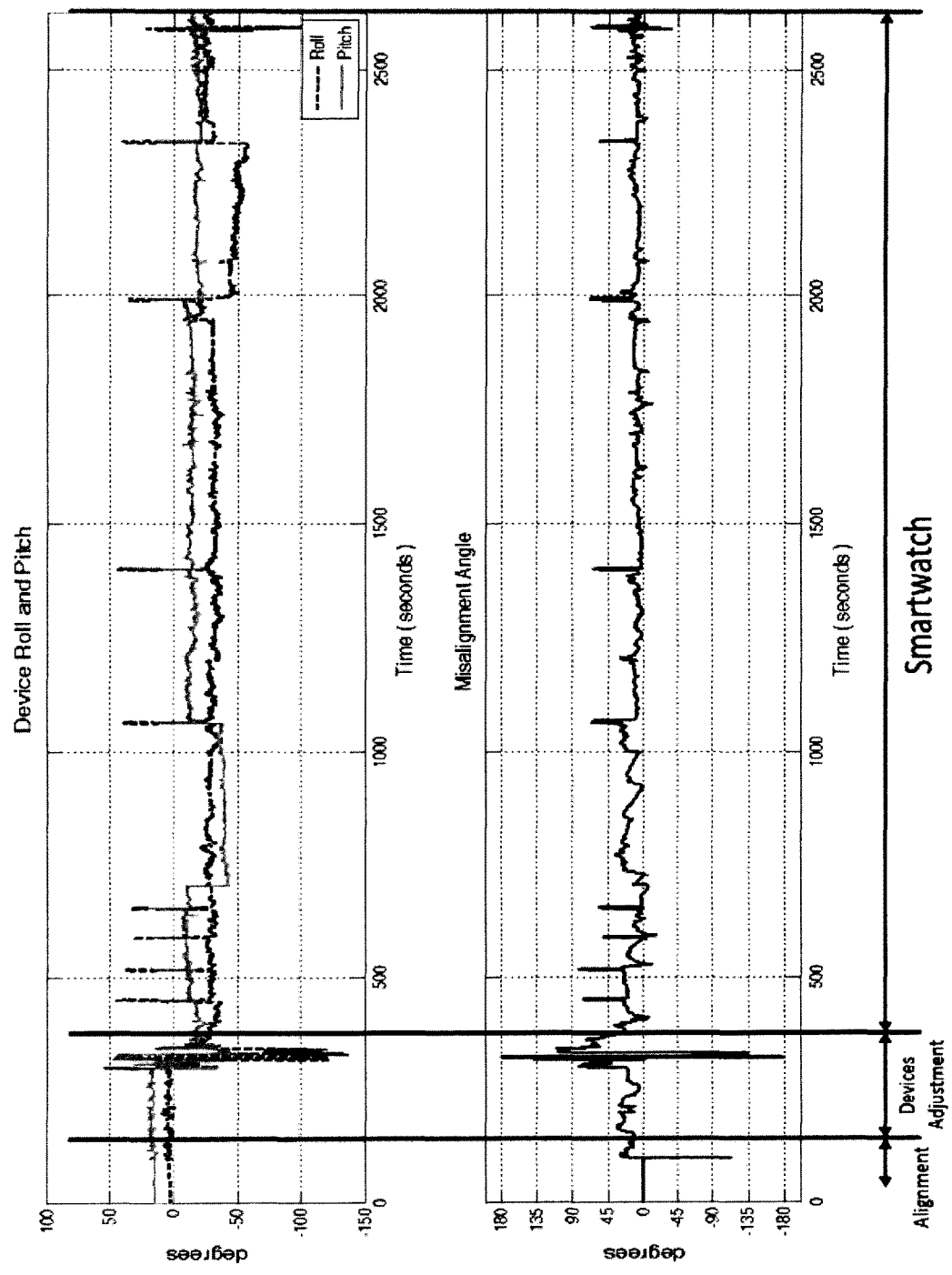
FIG. 29 shows the result of calculating the misalignment angle of the smart watch using the proposed method and using a belt clip as a reference in the fourth vehicle trajectory.

FIG. 29 demonstrates the results of applying the proposed method using the belt clip as the pseudo-tethered unit to calculate the misalignment of the smart watch. The figure shows some spikes in the misalignment signal and it happened more frequently in the beginning of the trajectory than in the end. This spikes represents the moments when the user was looking at his smart watch. At that instant the misalignment jumps near 90° and returns back quickly since the user does not last long, that is why it appears like a spike.

Figure 30:
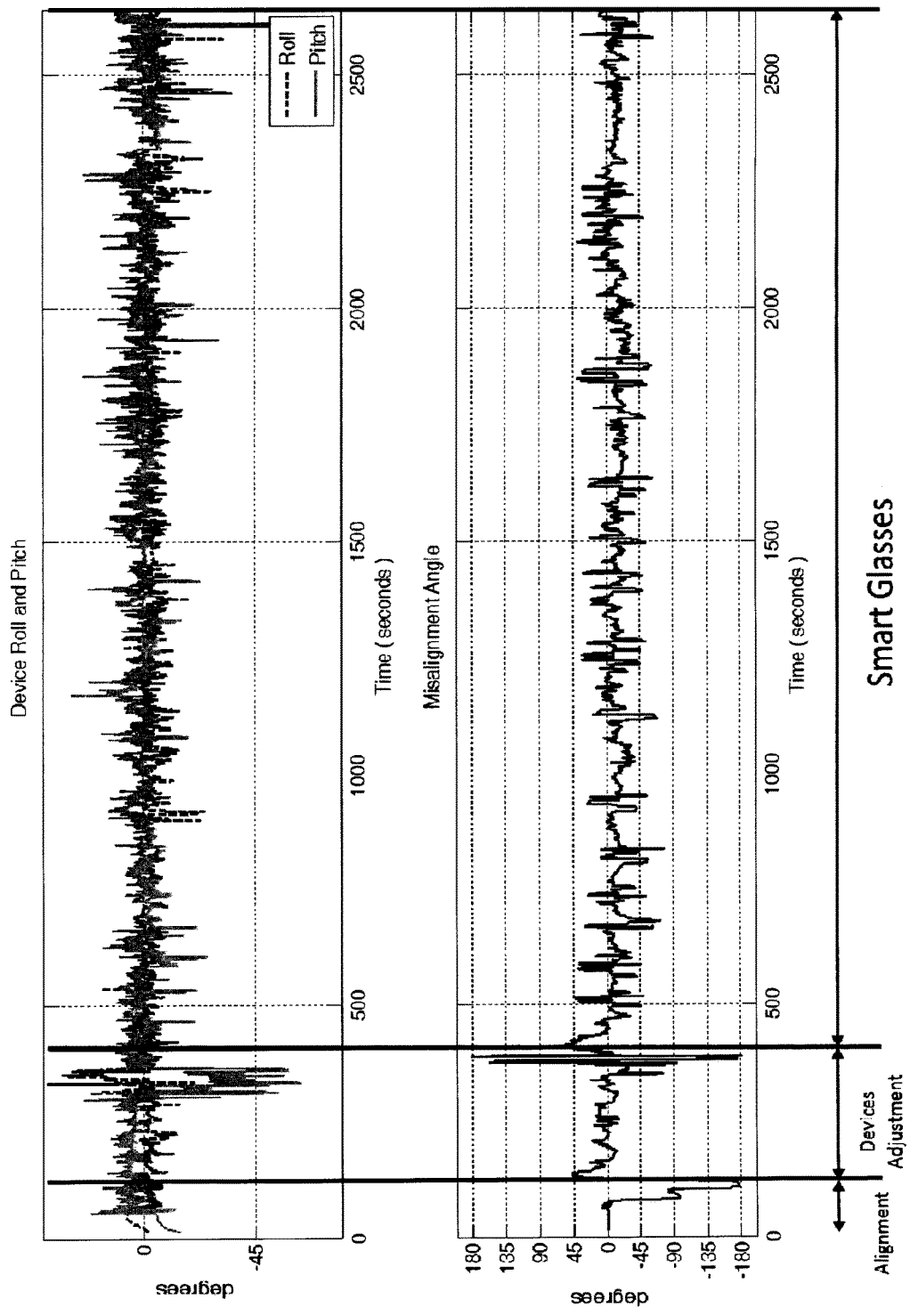
FIG. 30 shows the result of calculating the misalignment angle of the smart glasses using the proposed method and using a belt clip as a reference in the fourth vehicle trajectory.
Figure 31:
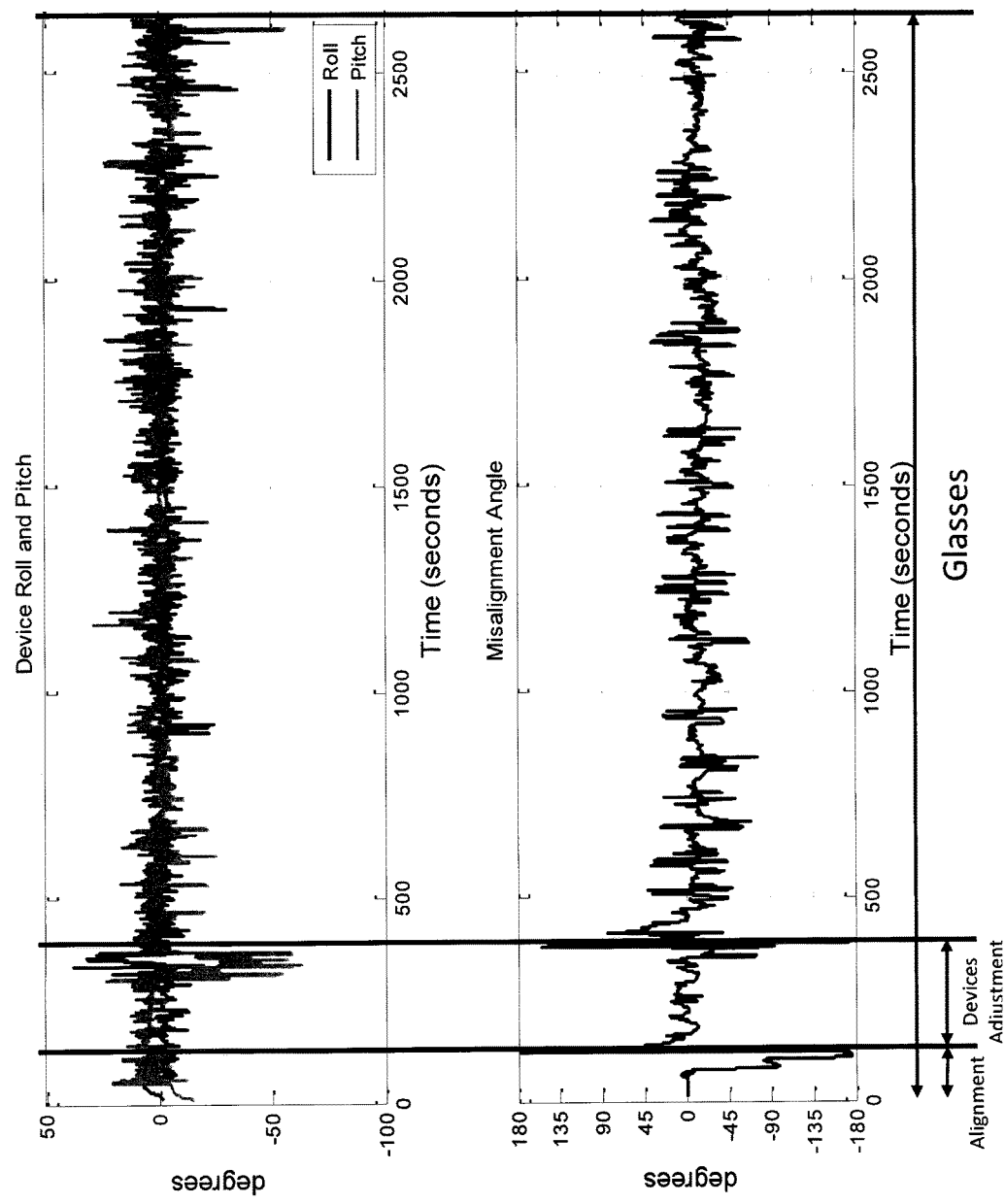
FIG. 31 shows the result of calculating the misalignment angle of the smart glasses using the proposed method and using a smart phone as a reference in the fourth vehicle trajectory.

FIG. 30 illustrates the outcome of applying the proposed method using the belt clip as the pseudo-tethered unit to calculate the misalignment of the smart glasses in this case. Despite that the user was looking towards the right and the left freely and randomly as shown in the figure. The misalignment estimation reflects these movements and returns back around zero without any problems FIG. 31 shows similar output to FIG. 28. However, in FIG. 29 a smart phone on seat was used as a reference to calculate the misalignment of the smart glasses instead of belt clip.

Figure 32:
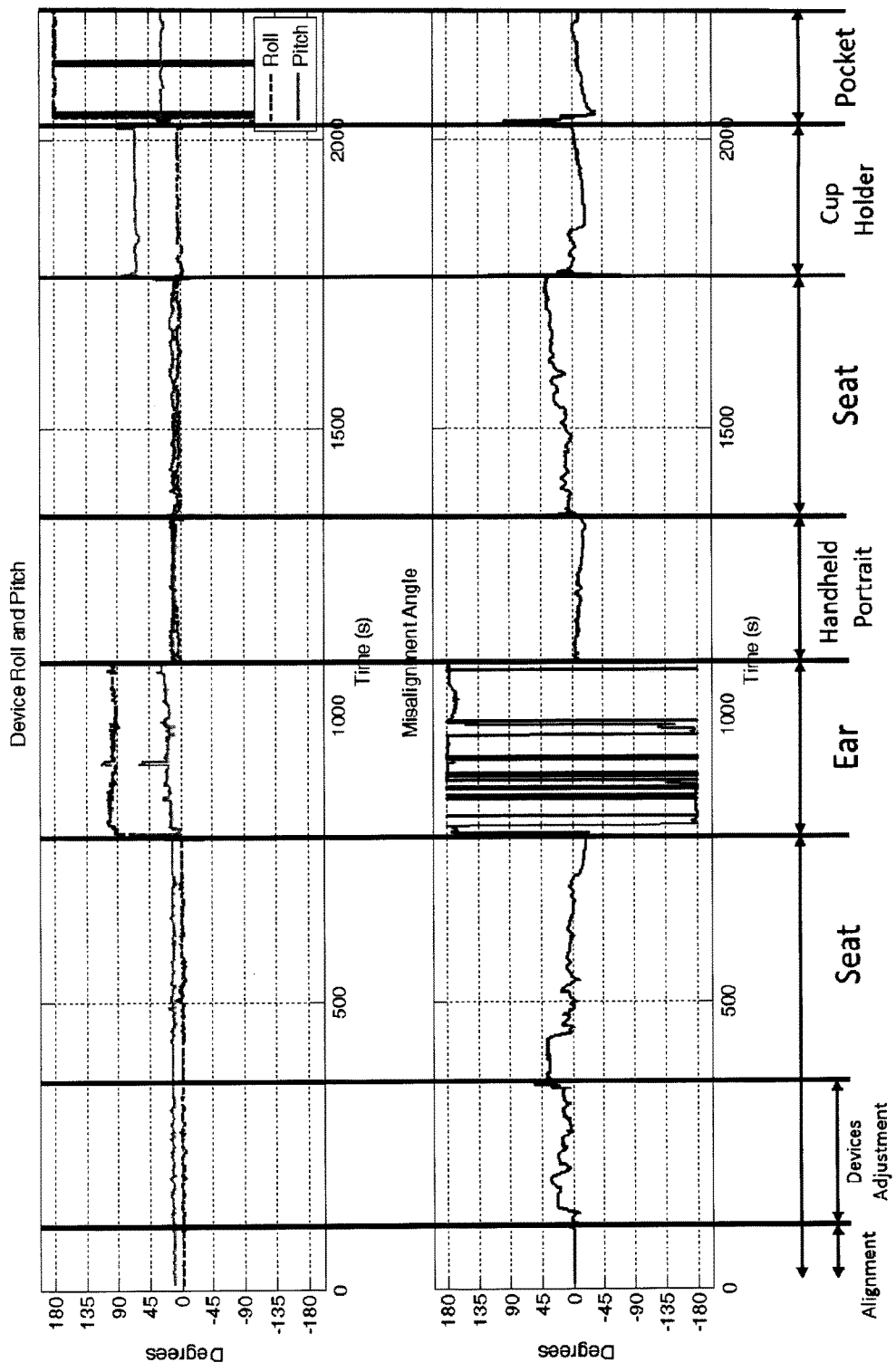
FIG. 32 shows the result of calculating the misalignment angle of the smart glasses using the proposed method and using a belt clip as a reference in the fifth vehicle trajectory.

FIG. 32 is showing the results of applying the proposed method using belt clip as a reference and calculating the misalignment of the free device (smart phone only) while being in different positions relative to the user, such as: seat, ear, handheld portrait, cup holder, and pocket. And which make it more challenging to calculate the free device misalignment.

All results show how the proposed method succeed in calculating the misalignment of the free device despite the challenge of changing the free device position relative to the user from time to time.

Example 2 (b)—Misalignment Calculation in Walking

For demonstration purposes, a free device to emulate a smart phone, a device strapped to the wrist to emulate a smart watch, a device in a belt clip to emulate an electronic belt clip, and a device strapped to a glass-like head mount to emulate a glasses were used in testing the proposed method.

Figure 28:
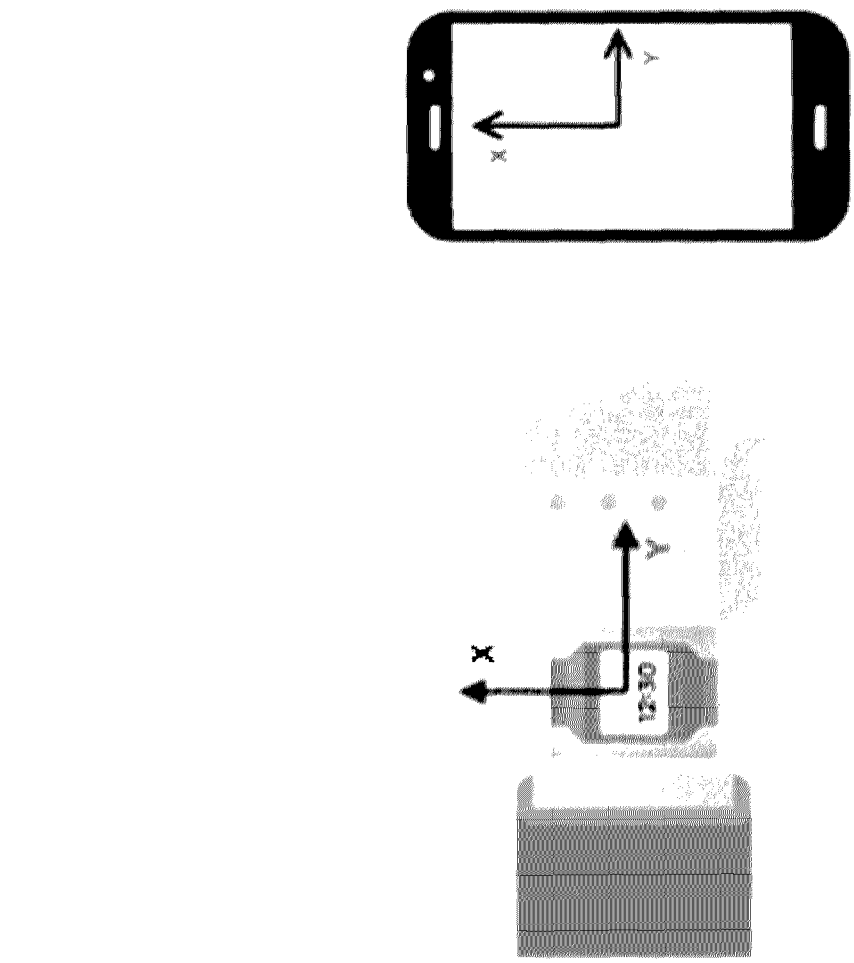
FIG. 28 shows the second emulated smartwatch (left) and smartphone (right) sensitive axes definition.

Results from two different walking trajectories are presented. Three devices were used, a belt clip, smart phone, and a smart watch. In both trajectories the user held the smart phone by the same hand having the smart watch, i.e. changing the smart phone use case affects both the smart phone and smart watch as well. The sensitivity axes of the inertial sensors included in the smart phone and the smart watch are shown in FIG. 28. While the sensitivity axes of the electronic belt clip is similar to that of the smart phone.

Ideally, the misalignment of the smart phone in handheld portrait and dangling use cases should be around zero, because the smartphone will be pointing forward in the same direction of motion of the user. However, in handheld landscape mode, it should be around ±90° (depending on the device direction towards the left or the right of the user), because the smart phone will be pointing towards the transverse direction of the user. Finally, in the case of ear use case, the misalignment should be around ±180°, because the smart phone in this case will be pointing towards the reverse direction of the user.

Nevertheless, the user cannot fix his hand so that the misalignment be exactly zero, ±90°, or 180° as in the ideal scenarios discussed above. In fact, this is one of the main objectives of the proposed method, which is not forcing any constraints on how the user carries or uses any device. That is why it is really difficult to compare the performance of the proposed method to some reference. Instead, we show some results to demonstrate how the proposed method result is compared to the ideal values of different use cases. At the end of this section, two more examples are shown to illustrate how misalignment angle estimation can affect the final navigation solution.

Following are the results for the first example (walking trajectory) where four devices were used: glasses, belt clip, watch, and a free moving smart phone. In this trajectory, the same hand having the smart watch held the smart phone. The trajectory consist of seven loops, at the beginning of each loop the user changed his use case for the free device (smart phone in this case). The different use cases used at each loop are: handheld portrait, pocket vertical, handheld landscape (phone speaker towards left), dangling, ear, handheld landscape (phone speaker towards right), and pocket horizontal respectively. The smart glasses device is used as the pseudo-tethered unit in this example. It has been used in calculating the misalignment of the free unit (smart phone in this case).

Figure 33:
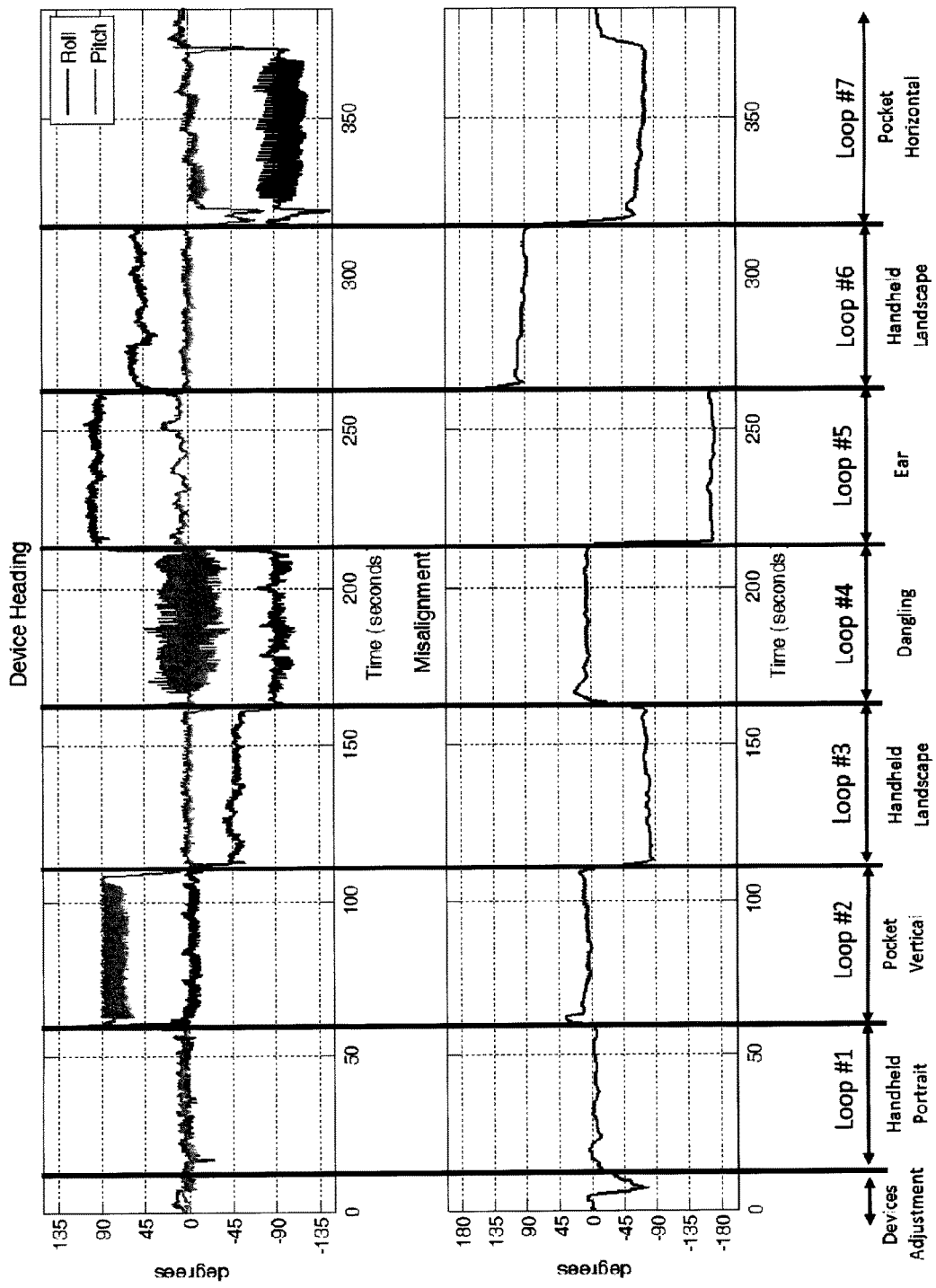
FIG. 33 shows the result of calculating the misalignment angle of the smart phone using the proposed method and using smart glasses as a reference in the fourth walking trajectory.

As demonstrated in FIG. 33, at the first loop, the misalignment is around zero because the free unit was in the handheld portrait use case. For the second and fourth loops of the trajectory, from the point of view of misalignment calculation, both the pocket vertical and dangling use cases respectively are similar to the handheld portrait use case. In both cases the free unit is pointing forward in the same direction of motion of the user, and the misalignment angle should be expected to be around zero. Our results confirmed that the estimated misalignment is indeed around the zero value. For the third loop of the trajectory, the misalignment is around −90° because the free unit was in the handheld landscape use case (pointing towards the left of the user). At the fifth loop, the misalignment is around −180° because the free unit was in the ear use case pointing backward of the user's direction of motion. The sixth loop is similar to the third one, except that the device is pointing towards the right of the user instead of the left, and that is why the misalignment angle is around +90° this time. Finally, in the seventh loop, the device is in the pocket again but horizontally pointing towards the left of the user, and that is why the misalignment angle is −90°.

Figure 34:
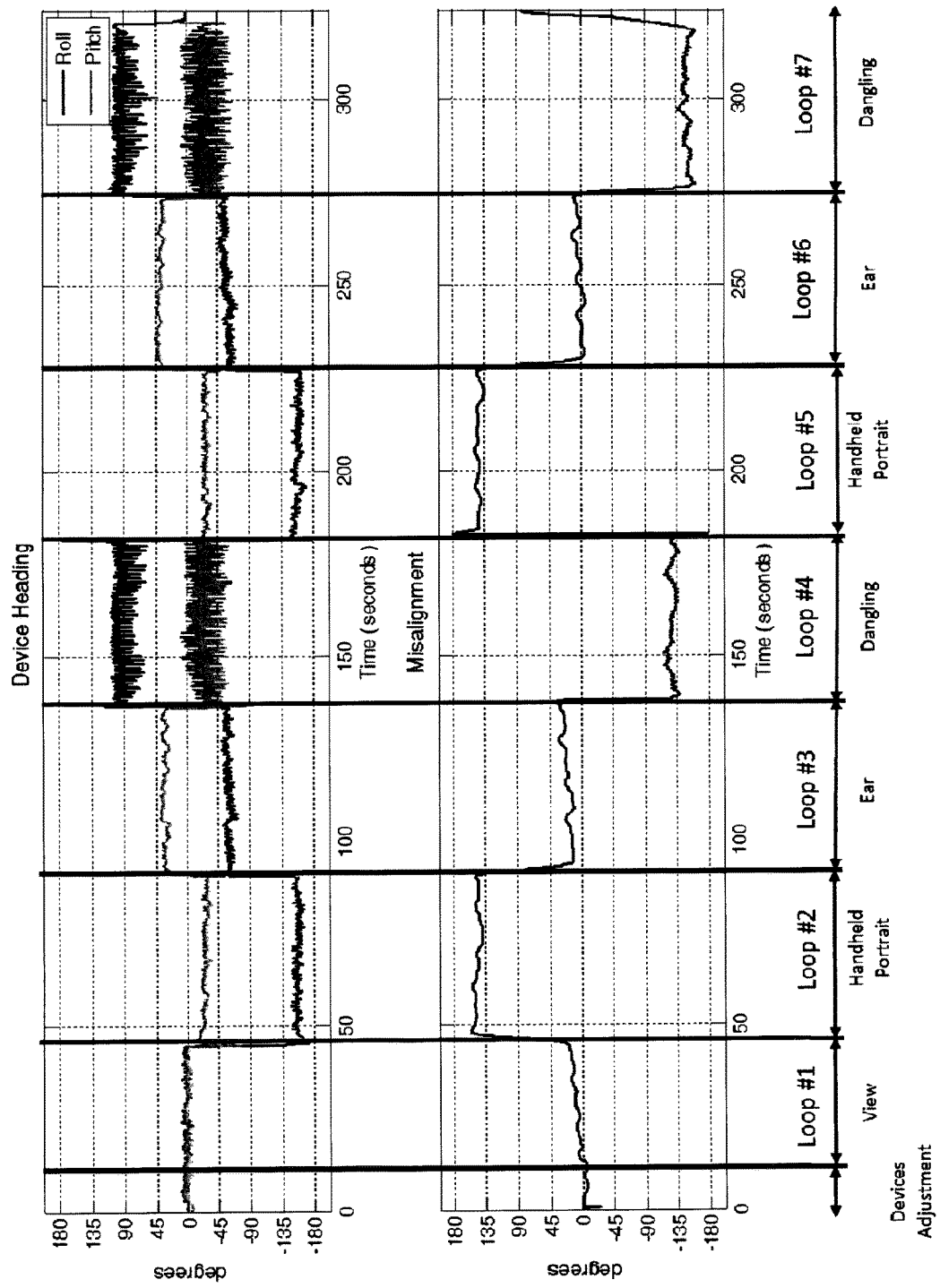
FIG. 34 shows the result of calculating the misalignment angle of the smart watch using the proposed method and using smart glasses as a reference in the fifth walking trajectory.

FIG. 34 is showing similar results to FIG. 33. However, in FIG. 34, the free device is the smart watch and was following different use cases as follows: view, handheld portrait, ear, dangling, handheld portrait, ear, and dangling.

Ideally, the misalignment of the smart watch in the view mode should be around zero. On the other hand, when the smart phone is in handheld portrait use case, the smart watch misalignment should be around ±135° (noting that the user will not hold the device at sharp 90° with respect to his wrist for his convenience, that is why ±135° instead of)±180°, because while the smart phone is pointing forward, the watch would be pointing backward. In ear use cases, the smart watch misalignment should be around zero since it points forward in the same direction of motion of the user. It should be noticed that the misalignment of the ear use case here is around zero instead ±180° (as mentioned in the previous section) because of the change in the axes definition of the watch in each example (as illustrated in FIG. 27 and FIG. 28). Finally, in dangling use cases, it should be around ±180°, since the smartwatch is pointing backwards.

Figure 35:
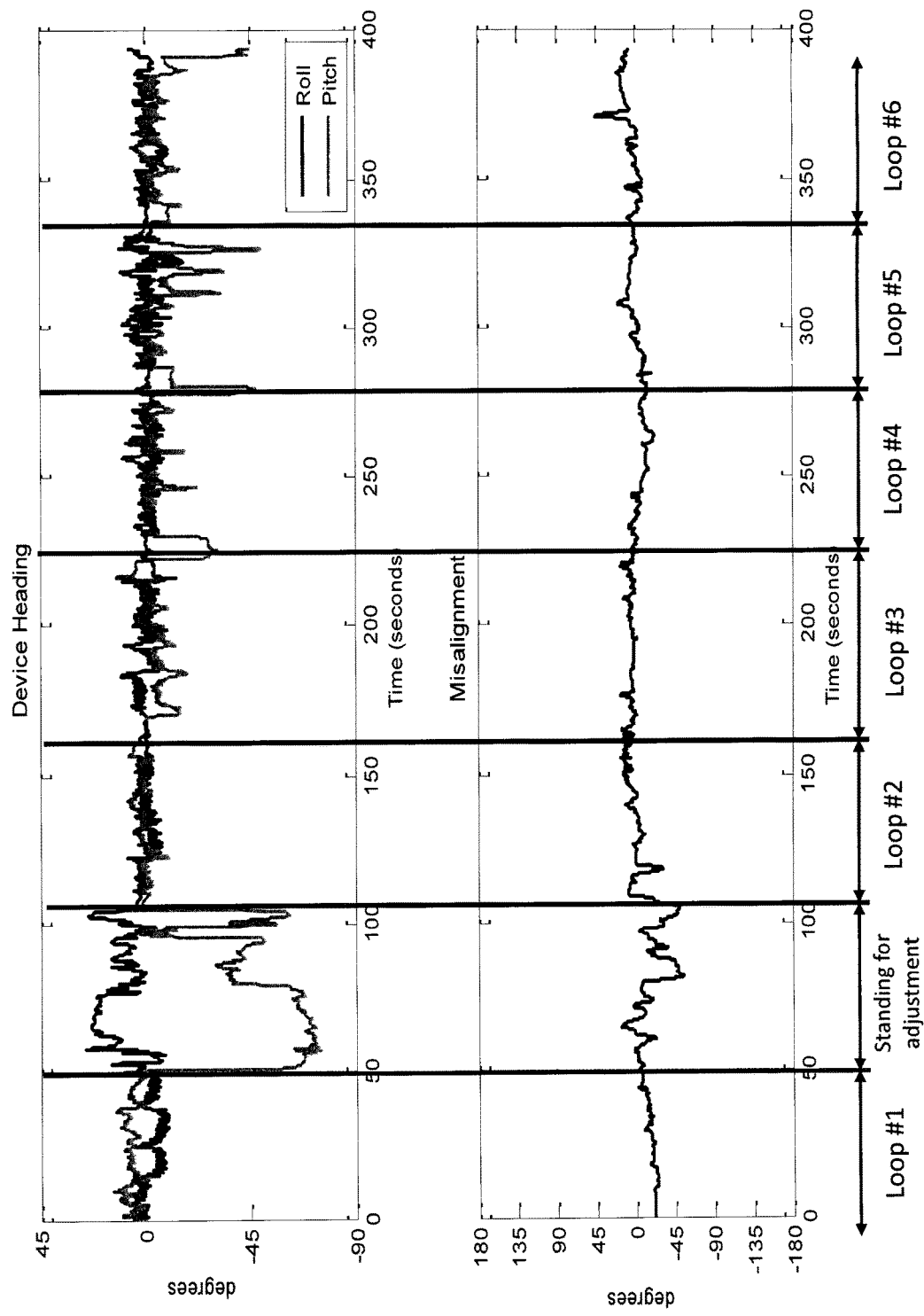
FIG. 35 shows the result of calculating the misalignment angle of the smart glasses using the proposed method and using a belt clip as a reference in the sixth walking trajectory.

FIG. 35 is showing the result of applying the proposed method using belt clip as a reference and calculating the misalignment of the f smart glasses, while the user is walking in loops indoors In the following two examples, the proposed method is compared to misalignment estimation using a single device. The misalignment estimation from single device work well in a lot of scenarios, but it can have its failures. The two trajectories presented here show some failures of the misalignment estimation from single device and how the misalignment estimation from multiple devices can avoid those failures and give better positioning results. The following two trajectories can lead us to the conclusion that integrating both methods can result in a more robust solution than each method alone, at least when there are more than one device available.

Figure 36:
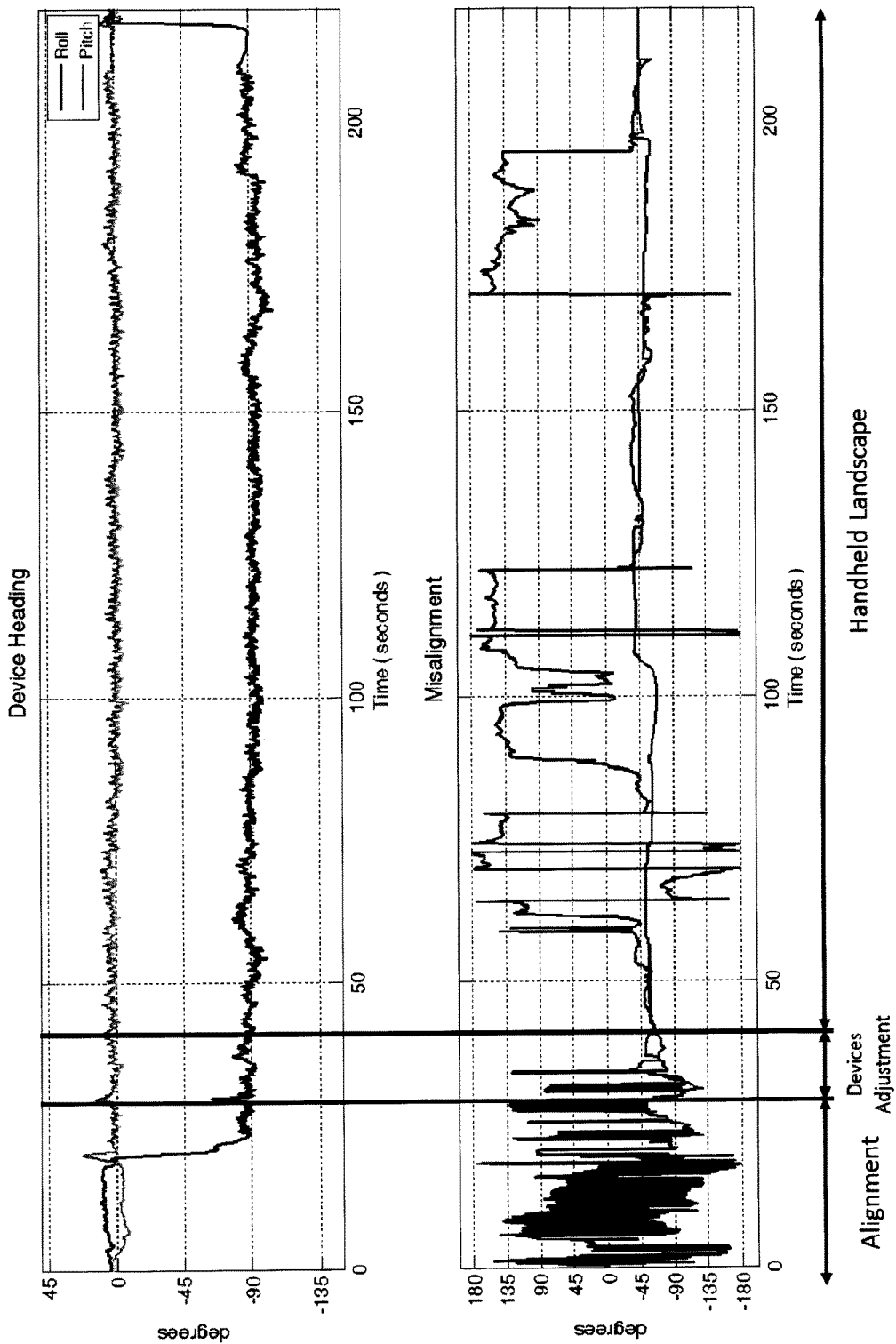
FIG. 36 shows the misalignment estimation using single IMU vs. multiple IMU for a seventh walking trajectory.
Figure 37:
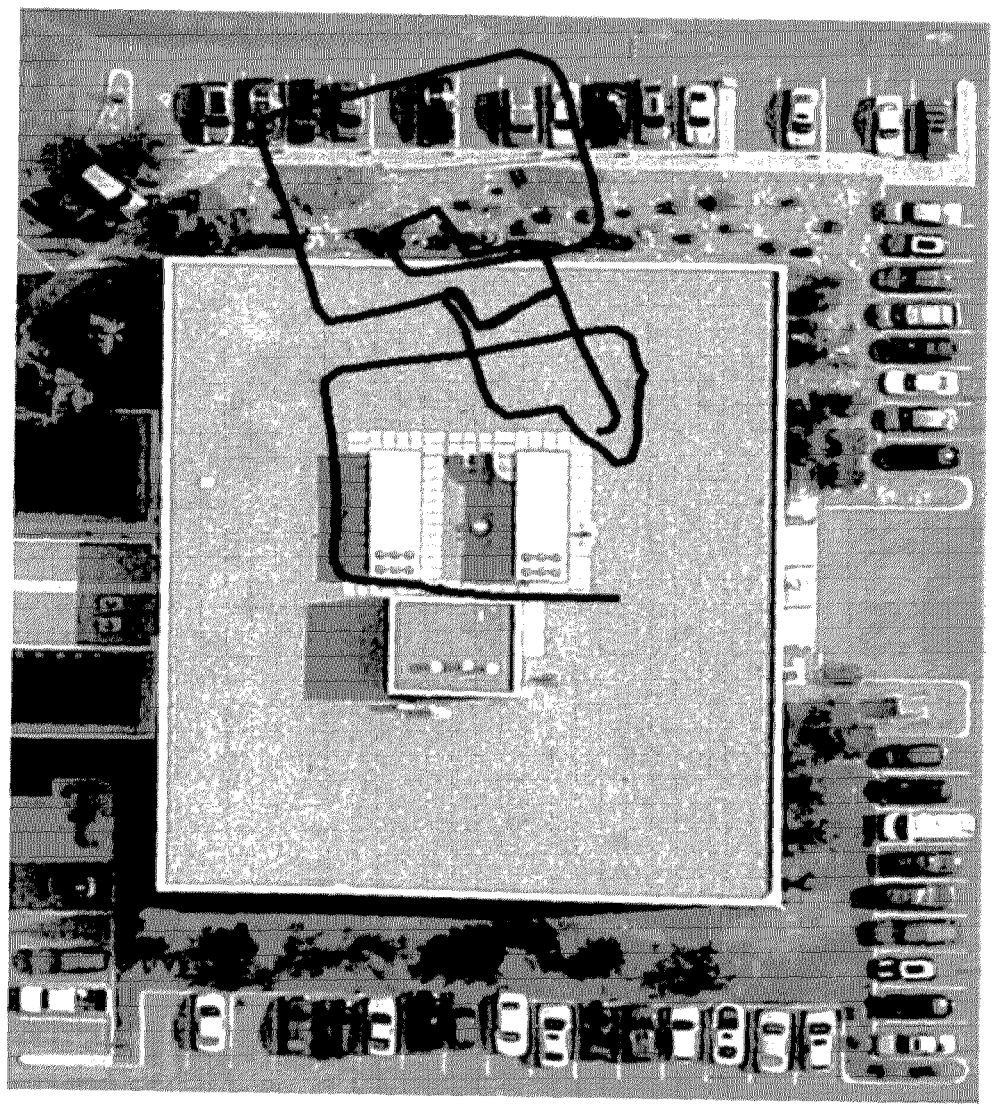
FIG. 37 shows the position solution using the misalignment estimation using single IMU for the seventh walking trajectory.
Figure 38:
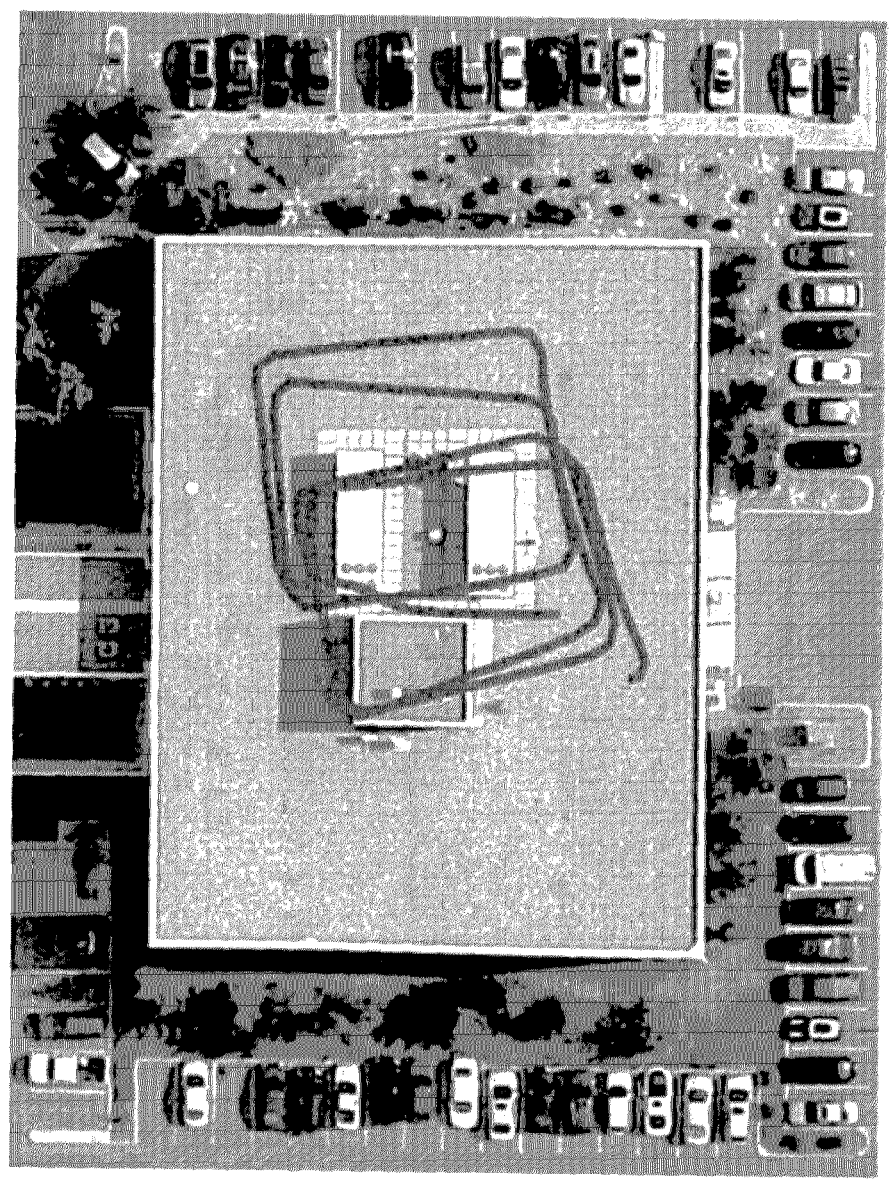
FIG. 38 shows the position solution using the misalignment estimation using multiple IMU for the seventh walking trajectory.

In FIG. 36, the misalignment angle estimation of a smartphone in handheld landscape (texting) use case is shown, the misalignment estimation from a single device in blue versus the misalignment estimation from multiple devices in red. Knowing that the user did not change the use case within the whole trajectory, a nearly constant value misalignment angle estimate shall be expected in this case. It is clear in the result that the misalignment angle from multiple devices is nearly constant as expected. On the other hand, the misalignment estimation from a single device is far away from being constant. The result of the comparison is clearly demonstrated in FIG. 37 and FIG. 38 where we can see the effect of the error of the misalignment angle reflected on the final navigation solution of the user.

One more note is that, the starting point of the trajectory is the same as the end point. Therefore, the closer both points in the final solution the better is this solution.

Figure 39:
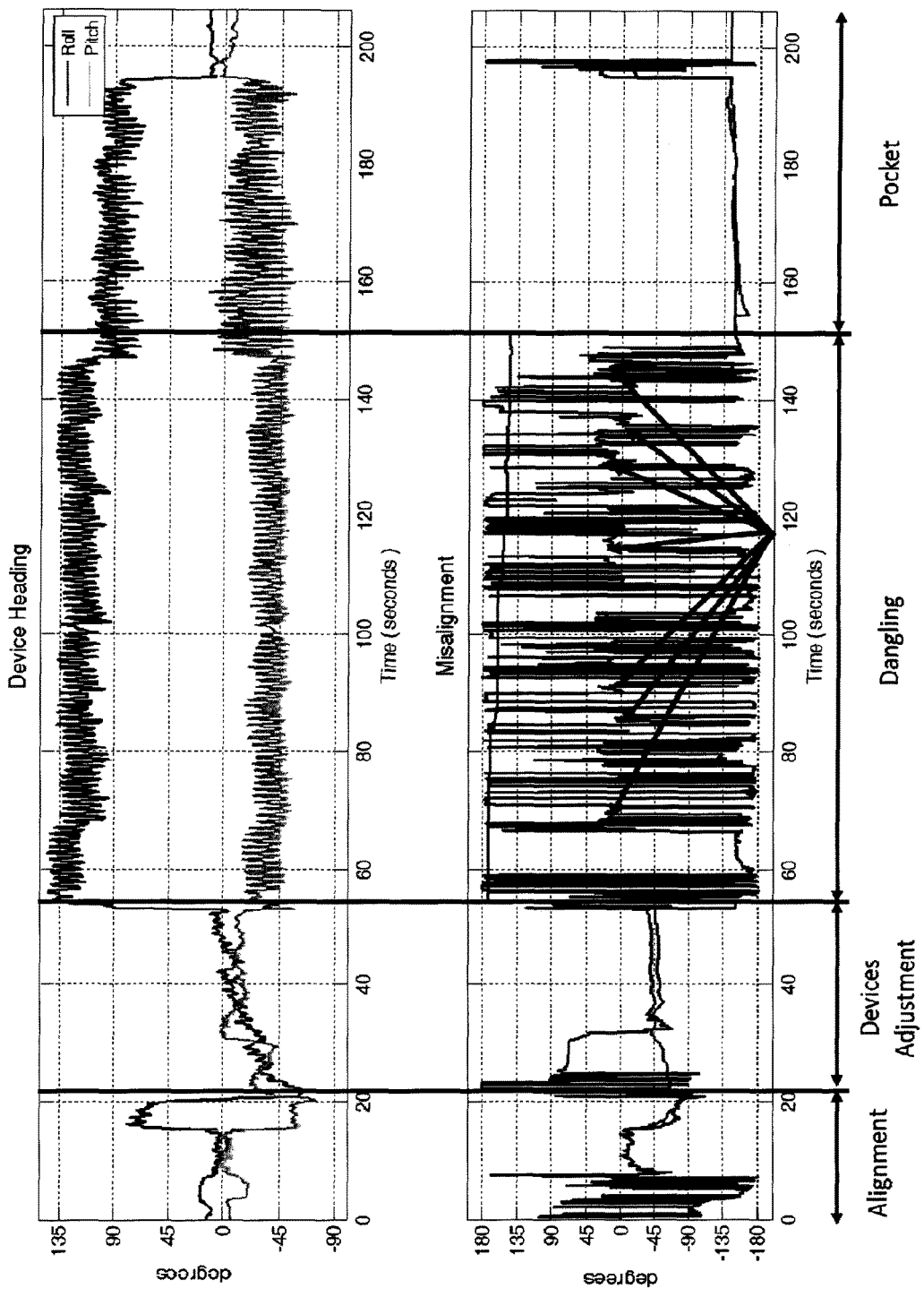
FIG. 39 shows the misalignment estimation using single IMU vs. multiple IMU for an eighth walking trajectory.
Figure 40:
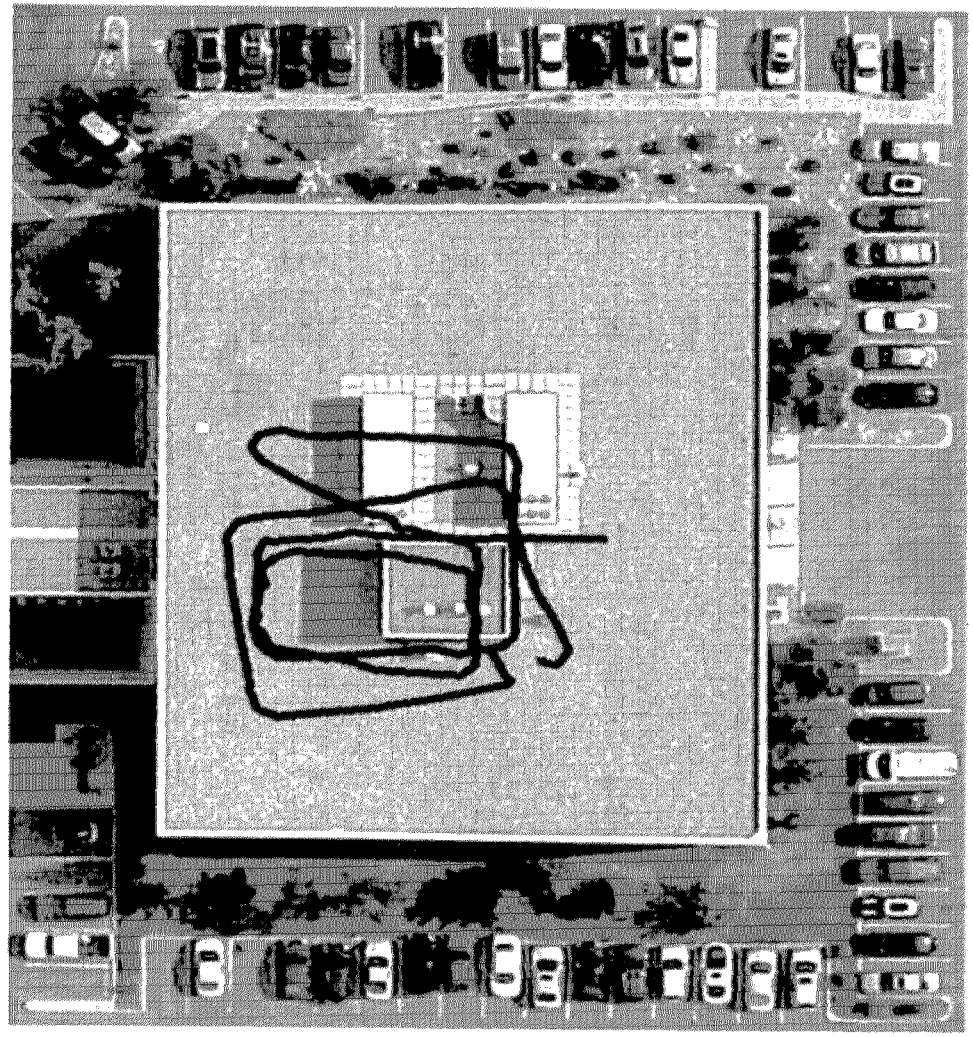
FIG. 40 shows the position solution using the misalignment estimation using single IMU for the eighth walking trajectory.
Figure 41:
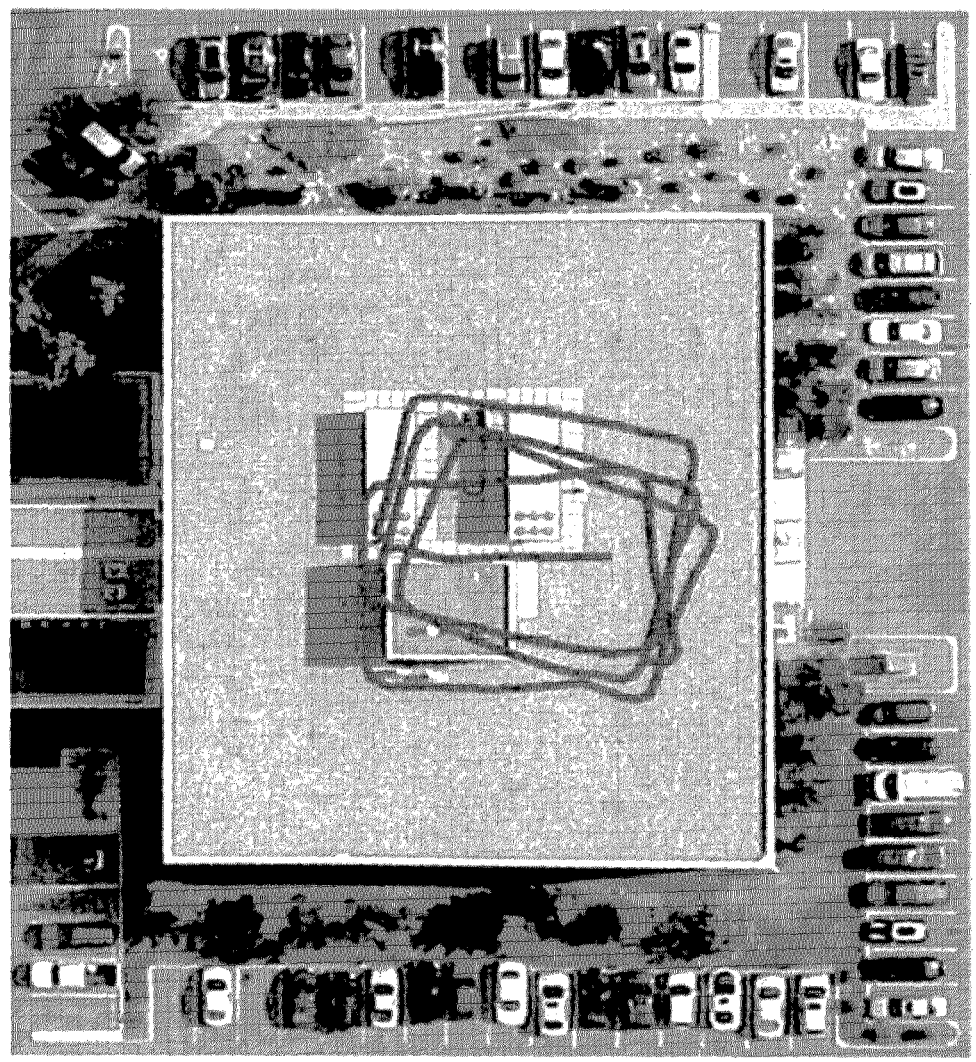
FIG. 41 shows the position solution using the misalignment estimation using multiple IMU for the eighth walking trajectory.

A similar result is shown In FIG. 39, while in this trajectory, the free device is a smartwatch in dangling use case, and an ideal misalignment angle estimate should be around ±180°. This is clearly achieved when we estimate the misalignment angle using multiple devices, but could not be achieved using single device. Where, in the single device case, the misalignment angle estimate is flipping between ±180° representing no problem since both angle are equivalent, but it flips to some values around the zero as well as indicated by the arrows shown in the figure, which in fact represent an 180° error in the misalignment angle estimation. In other words, the user motion can be interpreted as walking in the reverse direction in the final navigation solution. In fact, this is what is shown in FIG. 40 and FIG. 41. Instead of the user is moving in loops in clockwise direction, as it is the case in the multiple devices solution in FIG. 41. In FIG. 40, the user is shown to be moving in counter clock wise direction loops.

All results show how the proposed method succeed in calculating the misaligment of the free device or the strapped/pseudo-tethered device despite the challenge of changing the free device position relative to the user from time to time and using a semi-strapped or pseudo-tethered device as a reference (Glasses in this example).

Example 3—Multi-Mode Change (Driving & Walking)

For demonstration purposes, a free device to emulate a smart phone, a device strapped to the wrist to emulate a smart watch, and a device strapped to a glass-like head mount to emulate a glasses were used in testing the proposed method.

Figure 42:
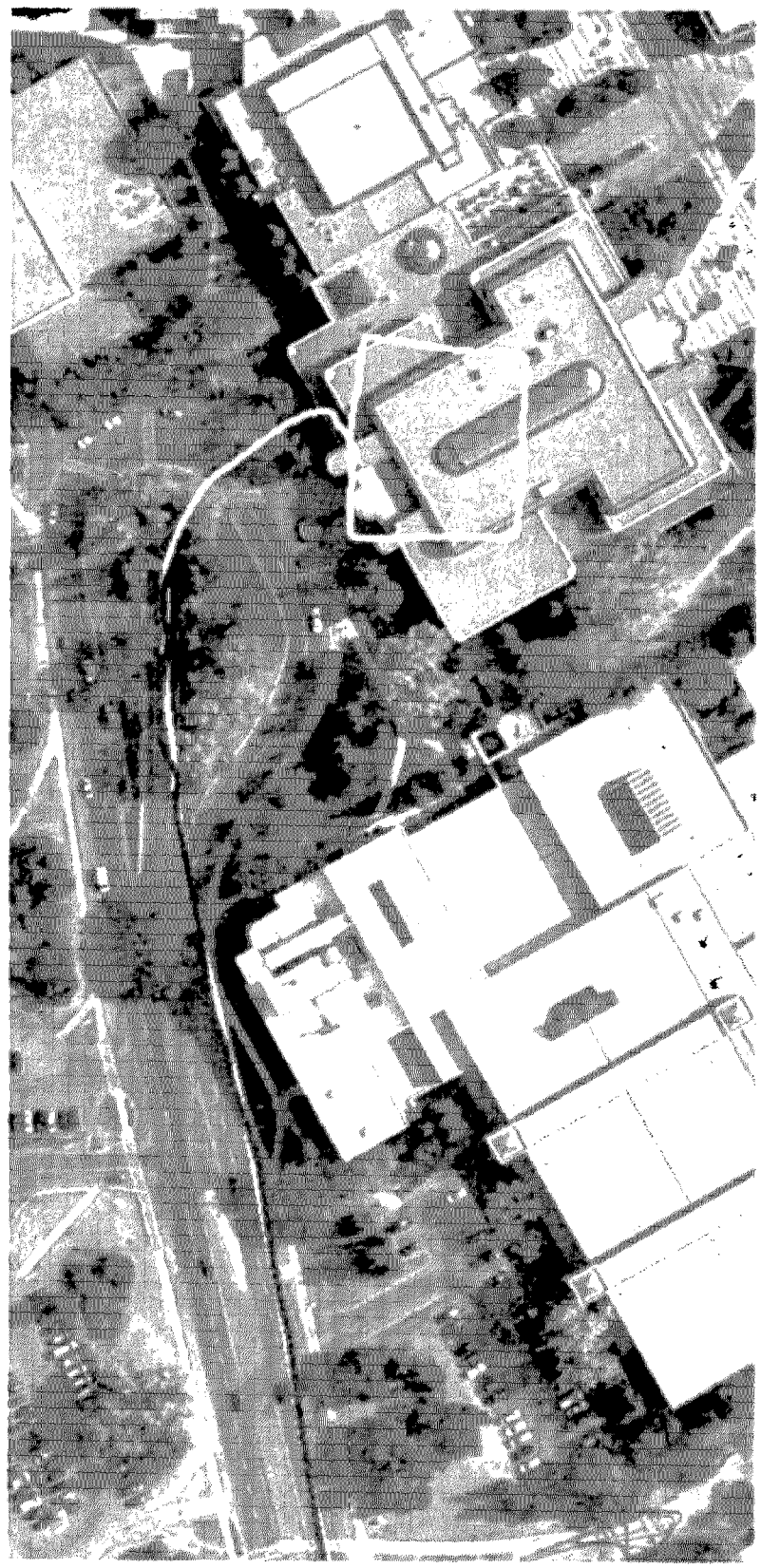
FIG. 42 shows the smart phone solution for a multi-mode driving/walking trajectory after zoom-in on the parkade (walking) area.
Figure 43:
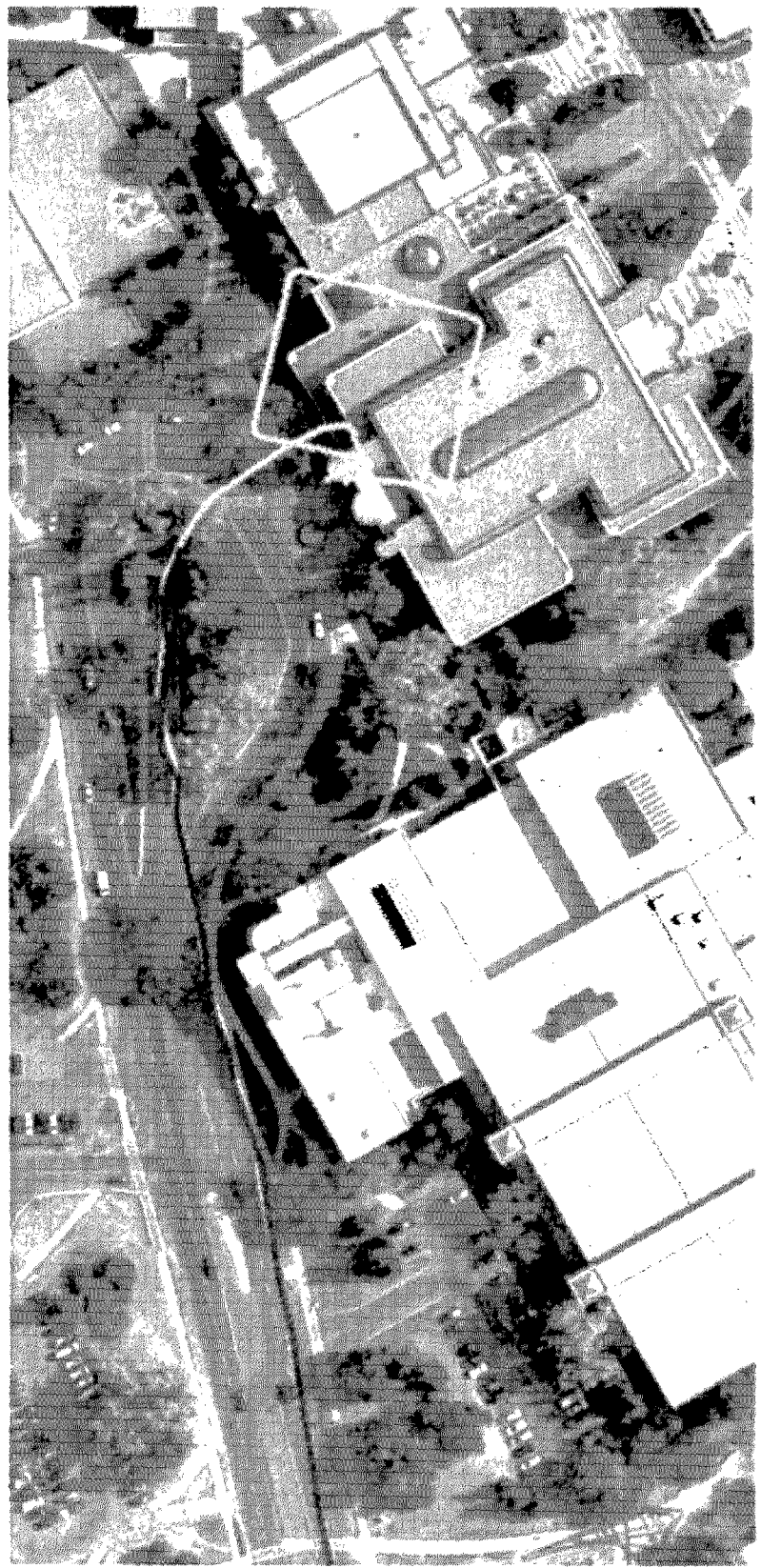
FIG. 43 shows the smart watch solution for the multi-mode driving/walking trajectory shown in FIG. 42 after zoom-in on the parkade (walking) area.
Figure 44:
FIG. 44 shows the proposed method solution for the multi-mode driving/walking trajectory shown in FIG. 42 after zoom-in on the parkade (walking) area.

In this last vehicle trajectory, two devices only were used—the smart phone, and the smart watch, and a change from driving mode to walking mode took place. The smart phone solution is shown in FIG. 42. The overall solution shape is correct except for the clock wise rotation. FIG. 43 shows the smart watch solution. This time the smart watch solution is again correct in shape but with rotation in counter clock wise direction. FIG. 44 shows the solution of the proposed method. The proposed method solution does not have neither rotations which make it better than both devices solution.

The embodiments and techniques described above may be implemented as a system or plurality of systems working in conjunction, or in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server or other devices.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for providing an enhanced navigation solution of at least one device within a platform, the device being strapped or non-strapped to the platform, and where non-strapped, the mobility of the device being constrained or unconstrained within the platform, the method comprising:
  the use of information from at least two sensor assemblies within the platform, wherein each sensor assembly comprises at least two different types of self-contained motion sensors, wherein at least one of the assemblies within the platform is on at least one device within the platform, wherein the at least two sensor assemblies are used for at least one of:
    i) bounding the navigation solution on the at least one device by the navigation solutions of the other sensor assemblies within the platform; wherein the bounding is at least one of: a) a statistical bounding; and b) a bounding that occurs by providing measurement updates to a state estimation technique, wherein the navigation solution utilizes the state estimation technique and wherein the bounding is performed when the device is strapped to the platform and when the device is non-strapped to the platform, such that when non-strapped the bounding is performed when the mobility of the device is constrained within the platform and when the mobility of the device is unconstrained within the platform; and
    ii) calculating a misalignment between the at least one device containing at least one sensor assembly and the platform, wherein at least one other sensor assembly within the platform is used for this calculation, wherein the enhanced navigation solution is based at least in part on the calculated misalignment and wherein the misalignment calculating is performed when the device is strapped to the platform and when the device is non-strapped to the platform, such that when non-strapped the misalignment calculating is performed when the mobility of the device is constrained within the platform and when the mobility of the device is unconstrained within the platform.

2. The method of claim 1, wherein the at least two sensor assemblies are one of: i) not all on the same device; and ii) all on the same device.

3. The method of claim 1, wherein the at least two sensor assemblies are used to bound the navigation solution on the at least one device by the navigation solutions of the other sensor assemblies within the platform.

4. The method of claim 3, wherein the bounding is one of the following: (i) a two dimensional position bounding, (ii) a three dimensional position bounding, (iii) a height bounding, (iv) a two dimensional velocity bounding, (v) a three dimensional velocity bounding, (vi) a vertical velocity bounding, (vii) a heading angle bounding, (viii) a pitch angle bounding, (ix) a roll angle bounding, and (x) any combination of (i) through (ix).

5. The method of any one of claim 3 or 4, comprising at least one of: i) wherein the bounding is a statistical bounding; and ii) wherein the navigation solution utilizes a state estimation technique, and wherein the bounding occurs by providing measurement updates to the state estimation technique.

6. The method of any one of claim 1 or 3, wherein the at least two sensor assemblies are used for calculating the misalignment between the at least one device containing at least one sensor assembly and the platform, wherein at least one other sensor assembly within the platform is used for this calculation.

7. The method of claim 6, wherein the calculated misalignment is used to enhance the navigation solution of the device for which the misalignment was calculated.

8. The method of claim 6, wherein the calculated misalignment is combined, averaged, smoothed, or filtered with the misalignment of the same device calculated by any other technique.

9. The method of claim 6, wherein the at least two sensor assemblies are used for at least one of:
   i) integrity assessment of the navigation solution;
   ii) integrity assessment of the navigation solution, wherein the integrity assessment is used to enhance the navigation solution;
   iii) integrity assessment of the navigation solutions of each sensor assembly and whether to exclude the navigation solutions of some sensor assemblies; and
   iv) integrity assessment of the navigation solutions of each sensor assembly and whether to exclude the navigation solutions of some sensor assemblies, wherein the integrity assessment is used to enhance the navigation solution.

10. The method of claim 6, wherein the navigation solution includes a mode of motion detection technique, and wherein the at least two sensor assemblies are used for at least one of:
    i) providing aid to the mode of motion detection; and
    ii) providing aid to the mode of motion detection, wherein the motion mode detection is used to enhance the navigation solution.

11. The method of claim 10, wherein the at least two sensor assemblies are used for at least one of:
    i) integrity assessment of the navigation solution;
    ii) integrity assessment of the navigation solution, wherein the integrity assessment is used to enhance the navigation solution;
    iii) integrity assessment of the navigation solutions of each sensor assembly and whether to exclude the navigation solutions of some sensor assemblies; and
    iv) integrity assessment of the navigation solutions of each sensor assembly and whether to exclude the navigation solutions of some sensor assemblies, wherein the integrity assessment is used to enhance the navigation solution.

12. The method of any one of claim 1 or 3, wherein the navigation solution includes a mode of motion detection technique, and wherein the at least two sensor assemblies are used for at least one of:
    i) providing aid to the mode of motion detection; and
    ii) providing aid to the mode of motion detection, wherein the motion mode detection is used to enhance the navigation solution.

13. The method of claim 12 wherein the at least two sensor assemblies are used for at least one of:
    i) integrity assessment of the navigation solution;
    ii) integrity assessment of the navigation solution, wherein the integrity assessment is used to enhance the navigation solution;
    iii) integrity assessment of the navigation solutions of each sensor assembly and whether to exclude the navigation solutions of some sensor assemblies; and
    iv) integrity assessment of the navigation solutions of each sensor assembly and whether to exclude the navigation solutions of some sensor assemblies, wherein the integrity assessment is used to enhance the navigation solution.

14. The method of any one of claim 1 or 3, wherein the at least two sensor assemblies are used for at least one of:
    i) integrity assessment of the navigation solution;
    ii) integrity assessment of the navigation solution, wherein the integrity assessment is used to enhance the navigation solution;
    iii) integrity assessment of the navigation solutions of each sensor assembly and whether to exclude the navigation solutions of some sensor assemblies; and
    iv) integrity assessment of the navigation solutions of each sensor assembly and whether to exclude the navigation solutions of some sensor assemblies, wherein the integrity assessment is used to enhance the navigation solution.

15. A system capable of utilizing information from at least two sensor assemblies within a platform to provide an enhanced navigation solution of at least one device within the platform, wherein each sensor assembly comprises at least two different types of self-contained motion sensors, the system comprising:
    at least one device, including at least one of the sensor assemblies, strapped or non-strapped to the platform, wherein where non-strapped, the mobility of the device may be constrained or unconstrained within the platform, at least one of the other sensor assemblies within the platform, and at least one processor operative to utilize information from the at least two sensor assemblies to provide the navigation solution, wherein the at least one processor uses information from the at least two sensor assemblies for at least one of:
    i) bounding the navigation solution on the at least one device by the navigation solutions of the other sensor assemblies within the platform, wherein the bounding is at least one of: a) a statistical bounding; and b) a bounding that occurs by providing measurement updates to a state estimation technique, wherein the navigation solution utilizes the state estimation technique and wherein the bounding is performed when the device is strapped to the platform and when the device is non-strapped to the platform, such that when non-strapped the bounding is performed when the mobility of the device is constrained within the platform and when the mobility of the device is unconstrained within the platform; and
    ii) calculating a misalignment between the at least one device containing at least one sensor assembly and the platform, wherein at least one other sensor assembly within the platform is used for this calculation, wherein the enhanced navigation solution is based at least in part on the calculated misalignment and wherein the misalignment calculating is performed when the device is strapped to the platform and when the device is non-strapped to the platform, such that when non-strapped the misalignment calculating is performed when the mobility of the device is constrained within the platform and when the mobility of the device is unconstrained within the platform.

16. The system of claim 15, wherein the at least one of the other sensor assemblies is one of: i) not on the same device; and ii) on the same device.

17. The system of claim 15, wherein the processor is further operative to use the at least two sensor assemblies to bound the navigation solution on the at least one device by the navigation solutions of the other sensor assemblies within the platform.

18. The system of claim 17, wherein the bounding is one of the following: (i) a two dimensional position bounding, (ii) a three dimensional position bounding, (iii) a height bounding, (iv) a two dimensional velocity bounding, (v) a three dimensional velocity bounding, (vi) a vertical velocity bounding, (vii) a heading angle bounding, (viii) a pitch angle bounding, (ix) a roll angle bounding, or (x) any combination of (i) through (ix).

19. The system of any one of claim 17 or 18, comprising at least of: i) wherein the bounding occurs by statistical bounding; and ii) wherein the navigation solution utilizes a state estimation technique, and wherein the bounding is through providing measurement updates to the state estimation technique.

20. The system of any one of claim 15 or 17, wherein the processor is further operative to use the at least two sensor assemblies for calculating the misalignment between the at least one device containing at least one sensor assembly and the platform, wherein at least one other sensor assembly within the platform is used for this calculation.

21. The system of claim 20, wherein the processor is further operative to use the calculated misalignment to enhance the navigation solution of the device for which the misalignment was calculated.

22. The system of claim 20, wherein the processor is further operative to combine, average, smooth, or filter the calculated misalignment with the misalignment of the same device calculated by any other technique.

23. The system of claim 20, wherein the processor is further operative to use the at least two sensor assemblies for at least one of:
   i) integrity assessment of the navigation solution;
   ii) integrity assessment of the navigation solution, wherein the integrity assessment is used to enhance the navigation solution;
   iii) integrity assessment of the navigation solutions of each sensor assembly and whether to exclude the navigation solutions of some sensor assemblies; and
   iv) integrity assessment of the navigation solutions of each sensor assembly and whether to exclude the navigation solutions of some sensor assemblies, wherein the integrity assessment is used to enhance the navigation solution.

24. The system of claim 20, wherein the processor is further operative to run a mode of motion detection technique, and wherein the processor is further operative to use the at least two sensor assemblies for at least one of:
   i) providing aid to the mode of motion detection; and
   ii) providing aid to the mode of motion detection, wherein the processor is further operative to use the motion mode detection is used to enhance the navigation solution.

25. The system of claim 24, wherein the processor is further operative to use the at least two sensor assemblies for at least one of:
   i) integrity assessment of the navigation solution;
   ii) integrity assessment of the navigation solution, wherein the integrity assessment is used to enhance the navigation solution;
   iii) integrity assessment of the navigation solutions of each sensor assembly and whether to exclude the navigation solutions of some sensor assemblies; and
   iv) integrity assessment of the navigation solutions of each sensor assembly and whether to exclude the navigation solutions of some sensor assemblies, wherein the integrity assessment is used to enhance the navigation solution.

26. The system of any one of claim 15 or 17, wherein the processor is further operative to run a mode of motion detection technique, and wherein the processor is further operative to use the at least two sensor assemblies for at least one of:
   i) providing aid to the mode of motion detection; and
   ii) providing aid to the mode of motion detection, wherein the processor is further operative to use the motion mode detection is used to enhance the navigation solution.

27. The system claim 26, wherein the processor is further operative to use the at least two sensor assemblies for at least one of:
   i) integrity assessment of the navigation solution;
   ii) integrity assessment of the navigation solution, wherein the integrity assessment is used to enhance the navigation solution;
   iii) integrity assessment of the navigation solutions of each sensor assembly and whether to exclude the navigation solutions of some sensor assemblies; and
   iv) integrity assessment of the navigation solutions of each sensor assembly and whether to exclude the navigation solutions of some sensor assemblies, wherein the integrity assessment is used to enhance the navigation solution.

28. The system of any one of claim 15 or 17, wherein the processor is further operative to use the at least two sensor assemblies for at least one of:
   i) integrity assessment of the navigation solution;
   ii) integrity assessment of the navigation solution, wherein the integrity assessment is used to enhance the navigation solution;
   iii) integrity assessment of the navigation solutions of each sensor assembly and whether to exclude the navigation solutions of some sensor assemblies; and
   iv) integrity assessment of the navigation solutions of each sensor assembly and whether to exclude the navigation solutions of some sensor assemblies, wherein the integrity assessment is used to enhance the navigation solution.

29. The system of claim 15, wherein the at least one device communicates with the at least one processor through: a. wireless communication, b. wired communication, or c. by embedding the at least one processor inside the at least one device in a single device.

30. The system of claim 15, wherein the at least one other sensor assembly communicates with the at least one device through: a. wireless communication, b. wired communication, or c. by embedding the at least one other sensor assembly inside the at least one device in a single device.

* * * * *